US010231025B2

(12) United States Patent
Johnson et al.

(10) Patent No.: US 10,231,025 B2
(45) Date of Patent: *Mar. 12, 2019

(54) METHOD AND SYSTEM FOR DISPLAYING AND UPDATING ELECTRONIC INFORMATION ON A DISPLAY DEVICE

(71) Applicant: HSNi, LLC, St. Petersburg, FL (US)

(72) Inventors: Gerard C. Johnson, Wesley Chapel, FL (US); Sean Bunner, St. Petersburg, FL (US); John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/242,706

(22) Filed: Aug. 22, 2016

(65) Prior Publication Data

US 2016/0360277 A1 Dec. 8, 2016

Related U.S. Application Data

(63) Continuation of application No. 12/476,145, filed on Jun. 1, 2009, now abandoned, which is a
(Continued)

(51) Int. Cl.
*G06Q 30/00* (2012.01)
*H04N 21/478* (2011.01)
(Continued)

(52) U.S. Cl.
CPC ... *H04N 21/47815* (2013.01); *G06Q 30/0601* (2013.01); *G06Q 30/0603* (2013.01);
(Continued)

(58) Field of Classification Search
CPC ........................................ G06Q 30/00
(Continued)

(56) References Cited

U.S. PATENT DOCUMENTS 5,438,355 A * 8/1995 Palmer ............... H04N 1/00098
348/E7.069
5,845,263 A 12/1998 Camaisa et al.
(Continued)

FOREIGN PATENT DOCUMENTS

| KR | 10-0692209 B1 | 3/2007 |
| WO | 02/063426 A2 | 8/2002 |
| WO | 2006-101348 A1 | 9/2006 |

*Primary Examiner* — Talia F Crawley
(74) *Attorney, Agent, or Firm* — Arent Fox LLP

(57) ABSTRACT

A method and system is provided for displaying and updating electronic information on a display device. In an exemplary aspect, the method includes storing first and second digital information relating to first and second products, respectively, and transmitting this information to a display device to be displayed thereon by user interface pages navigable by a user. Moreover, the method includes determining a current page that is being displayed on the display device and determining whether either the first digital information or the second digital information product is being displayed on the current page. When the current page is displaying the first digital information, the method transmits unscheduled updates of the first digital information, such that the current page dynamically displays updated first digital information. Alternatively, when the current page is not displaying the second digital information, the method transmits scheduled updates of the second digital information.

27 Claims, 31 Drawing Sheets

Related U.S. Application Data continuation-in-part of application No. 11/948,818, filed on Nov. 30, 2007, now Pat. No. 7,752,083.

(51) Int. Cl.

| | | |
|---|---|---|
| *G06Q 30/06* | (2012.01) | |
| *H04N 21/254* | (2011.01) | |
| *H04N 21/258* | (2011.01) | |
| *H04N 21/262* | (2011.01) | |
| *H04N 21/435* | (2011.01) | |
| *H04N 21/4722* | (2011.01) | |
| *H04N 21/4782* | (2011.01) | |
| *H04N 21/658* | (2011.01) | |
| *H04N 21/81* | (2011.01) | |
| *H04N 21/8543* | (2011.01) | |

(52) U.S. Cl.
CPC ... *H04N 21/2542* (2013.01); *H04N 21/25891* (2013.01); *H04N 21/26291* (2013.01); *H04N 21/435* (2013.01); *H04N 21/4722* (2013.01); *H04N 21/4782* (2013.01); *H04N 21/6581* (2013.01); *H04N 21/812* (2013.01); *H04N 21/8543* (2013.01)

(58) Field of Classification Search
USPC ........................................ 705/26, 27
See application file for complete search history.

(56) References Cited

U.S. PATENT DOCUMENTS

| | | | |
|---|---|---|---|
| 5,903,816 A * | 5/1999 | Broadwin | H04N 7/147 348/565 |
| 6,085,171 A | 7/2000 | Leonard | |
| 6,129,274 A | 10/2000 | Suzuki | |
| 6,211,879 B1 | 4/2001 | Soohoo | |
| 6,275,989 B1 | 8/2001 | Decinque | |
| 6,317,885 B1 | 11/2001 | Fries | |
| 6,665,017 B1 | 12/2003 | Raiyat | |
| 6,711,552 B1 * | 3/2004 | Kay | G06Q 10/087 348/564 |
| 6,873,969 B2 | 3/2005 | Stone et al. | |
| 7,017,175 B2 | 3/2006 | Alao et al. | |
| 7,194,754 B2 | 3/2007 | Tomsen et al. | |
| 7,237,185 B1 | 6/2007 | Sequeira et al. | |
| 7,752,083 B2 * | 7/2010 | Johnson | G06Q 30/02 705/26.1 |
| 8,131,601 B2 | 3/2012 | Choe | |
| 2001/0004200 A1 | 11/2001 | Koopersmith | |
| 2002/0002538 A1 | 1/2002 | Ling | |
| 2002/0055878 A1 | 5/2002 | Burton et al. | |
| 2002/0072974 A1 * | 6/2002 | Pugliese, III | G06Q 30/02 705/14.16 |
| 2002/0169675 A1 * | 11/2002 | Helot | G06Q 10/087 705/27.2 |
| 2002/0184623 A1 * | 12/2002 | Hodge | H04N 5/44591 725/37 |
| 2002/0194604 A1 | 12/2002 | Sanchez et al. | |
| 2003/0110507 A1 | 6/2003 | Dimitrova et al. | |
| 2003/0158796 A1 * | 8/2003 | Balent | G06Q 10/087 705/28 |
| 2003/0188310 A1 * | 10/2003 | Klosterman | H04N 5/44543 725/42 |
| 2003/0226141 A1 | 12/2003 | Kransnow et al. | |
| 2004/0034571 A1 | 2/2004 | Wood et al. | |
| 2004/0044564 A1 * | 3/2004 | Dietz | G06Q 30/02 705/14.58 |
| 2004/0060068 A1 | 3/2004 | Barbier et al. | |
| 2004/0139480 A1 | 7/2004 | Delpuch et al. | |
| 2004/0163113 A1 | 8/2004 | Namvar | |
| 2005/0071242 A1 | 3/2005 | Allen et al. | |
| 2005/0149988 A1 | 7/2005 | Grannan | |
| 2005/0169255 A1 | 8/2005 | Shimomura et al. | |
| 2005/0242755 A1 | 11/2005 | George | |
| 2006/0117340 A1 | 6/2006 | Pavlovskaia et al. | |
| 2006/0235764 A1 | 10/2006 | Bamborough et al. | |
| 2006/0265290 A1 | 11/2006 | Perrier et al. | |
| 2006/0271437 A1 * | 11/2006 | Maggio | G06Q 10/08 705/346 |
| 2006/0293965 A1 | 12/2006 | Burton | |
| 2007/0016488 A1 | 1/2007 | Burton | |
| 2007/0107017 A1 | 5/2007 | Angel et al. | |
| 2007/0124201 A1 * | 5/2007 | Hu | G06F 21/10 705/14.2 |
| 2007/0157251 A1 | 7/2007 | Shrivastava et al. | |
| 2007/0185778 A1 | 8/2007 | Weng | |
| 2007/0186252 A1 * | 8/2007 | Maggio | G06Q 10/087 725/86 |
| 2007/0250400 A1 | 10/2007 | Eglen et al. | |
| 2007/0266413 A1 | 11/2007 | Davis | |
| 2008/0086752 A1 * | 4/2008 | Perez | G06Q 30/02 725/87 |
| 2008/0140532 A1 | 6/2008 | Johnson et al. | |
| 2008/0245863 A1 * | 10/2008 | Buchheit | G06Q 30/02 235/383 |
| 2011/0131112 A1 | 6/2011 | Choe | |

\* cited by examiner

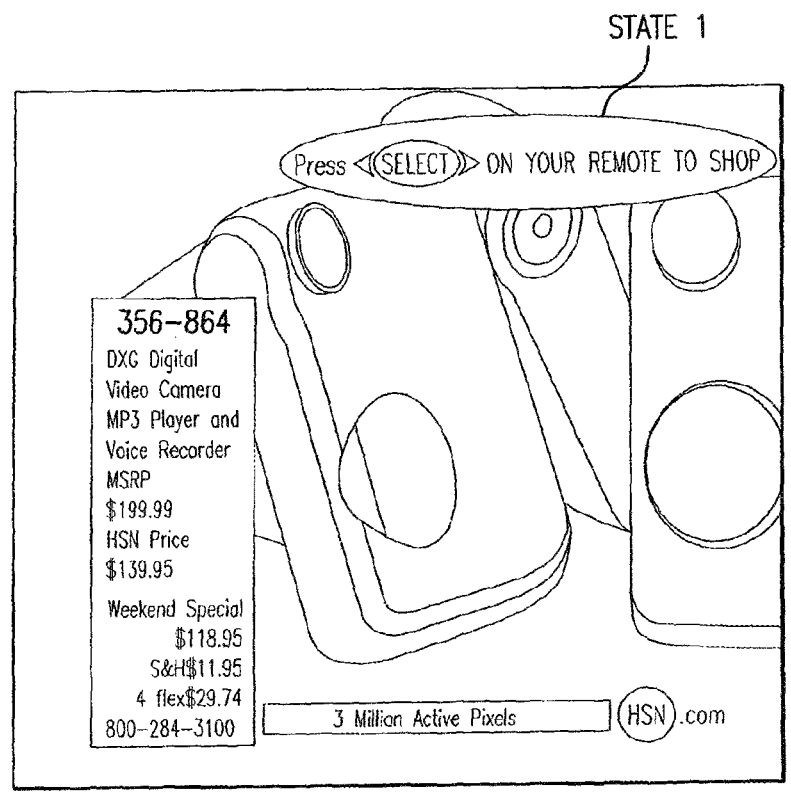
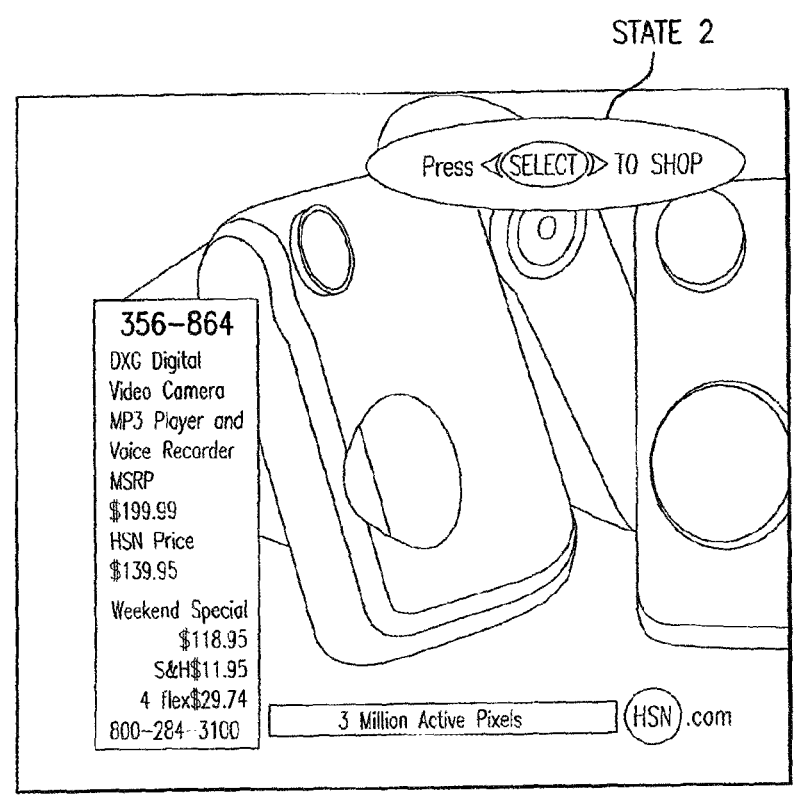
FIG.3

(HSN)

Select your product preference
△ More Options $89.99 — Wolfgang Puck 5-Speed 250 Watt Triple Beater Hand Mixer NOT AVAILABLE — Wolfgang Puck 5-Speed 300 Watt Triple Beater Hand Mixer SOLD OUT — Wolfgang Puck 5-Speed 450 Watt Triple Beater Hand Mixer ▽ More Options ◁ Back    ⚠ Help    © Exit HSN iTV

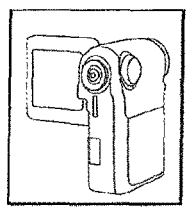
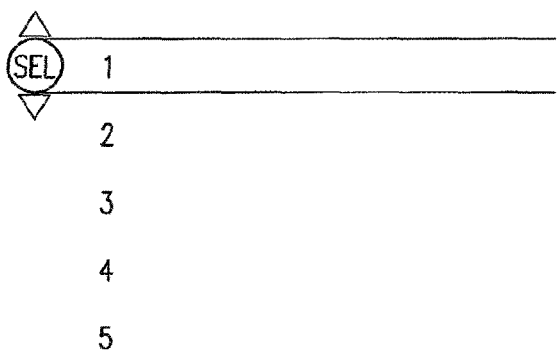
FIG. 10

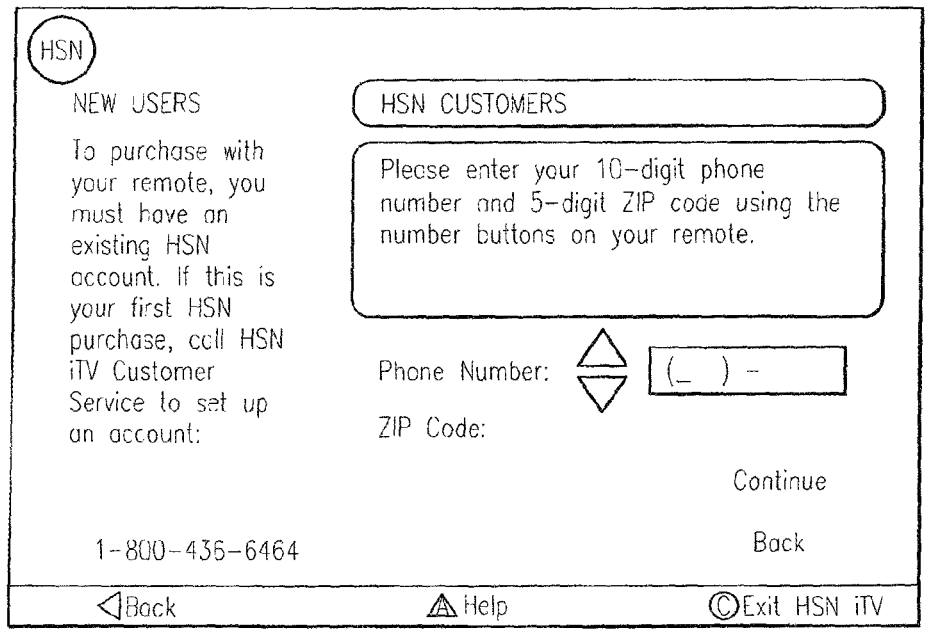
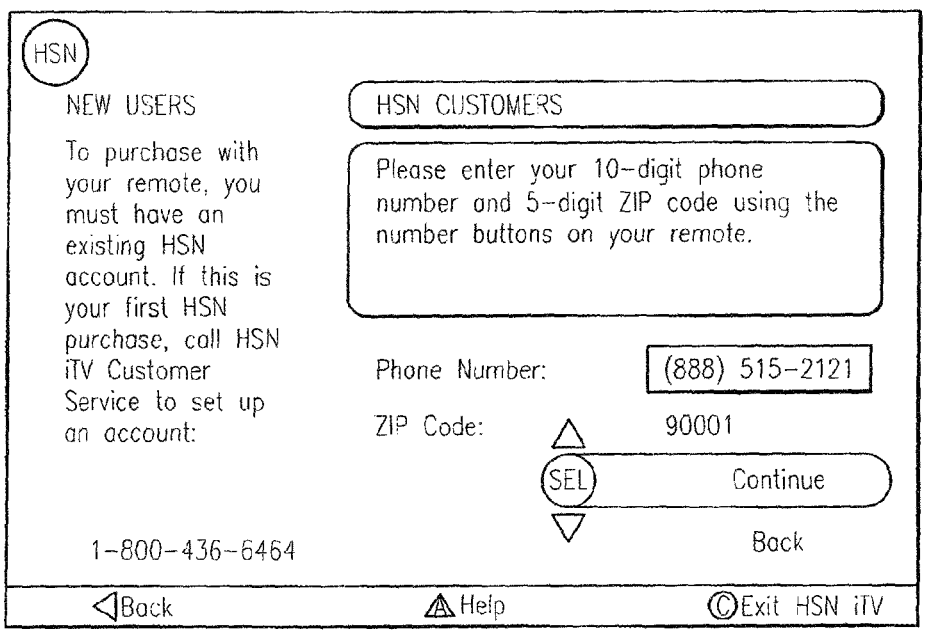
FIG.11

FIG.12

(HSN)

The item you selected is on waitlist.
If the item becomes available within 45 days,
we will ship the item immediately. Your credit
card will be billed on the day the item ships.

Would you still like to order this item?

(SEL) Yes

No

◁Back    ⚠Help    ©Exit HSN iTV

FIG.14

There was a problem placing this order.
To complete your order, please call HSN iTV
Customer Service at 1-800-436-6464.
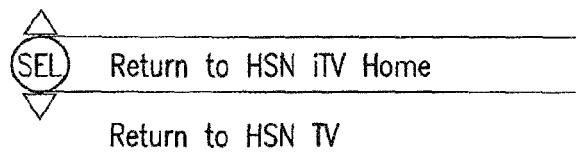
Return to HSN TV
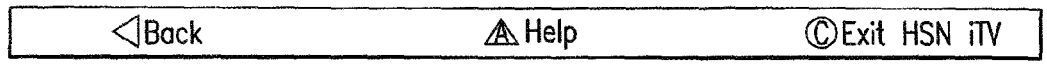
◁ Back     ⚠ Help     ⓒ Exit HSN iTV
FIG.16

FIG. 17

Press [B] to complete your purchase.

Press ◁ Back to return to the previous page.

HSN iTV Help Main Menu

What is HSN iTV?

How do I use my TV remote to buy?

How do I contact HSN Customer Service?

Return to my order

◁ Back     ⚠ Help     ©Exit HSN iTV

What is HSN iTV?

HSN shopping is now interactive and easier than ever! You can now buy the items you see on TV with your remote control.

When you see a product you like, just press the SELECT button on your remote. You will be guided through our safe and secure order process. You can check the status of Page 1 of 2 ▷

SEL  Return to my order

Return to Help Main Menu

◁ Back     ⚠ Help     © Exit HSN iTV

What is HSN iTV?

your order by using your iTV order number on hsn.com or by calling HSN customer service.

Remember: You must have an HSN iTV PIN set up in order to use HSN iTV. If you have never shopped with HSN iTV, call 1-800-436-6464 to have an HSN iTV PIN number created.
This process will only take a few minutes.

◁ Page 2 of 2

SEL  Return to my order

Return to Help Main Menu

◁ Back     ⚠ Help     © Exit HSN iTV

FIG. 21

 How do I use my TV remote to buy?
 Select a product/option and go on to next step
 Navigate on the screen or move back a page to see more choices
 Go to help menu
 Buy it – completes a purchase (order review page ONLY)
 Exit HSN iTV and return to live program
 Return to my order
Return to Help Main Menu
◁ Back     ⚠ Help     ⓒ Exit HSN iTV
FIG.22

How do I contact HSN iTV Customer Service?
Still have more questions about HSN iTV?
Call HSN iTV Customer Service at 1-800-436-6464
 Return to my order
Return to Help Main Menu
◁ Back     ⚠ Help     Ⓒ Exit HSN iTV
FIG.23

Please wait, your order is being processed...

HSN iTV isn't available right now.

Please call HSN iTV Customer Service at 1-800-436-6464 to place an order quickly over the phone or visit www.hsn.com.

We should have HSN iTV up and running shortly.

◁Back　⚠Help　©Exit HSN iTV

Due to system delays, we can confirm
that your order was placed.

Please call HSN iTV Customer Service at
1-800-436-6464 to confirm the status
of your order.

We apologize for any inconvenience.

| ◁Back | ⚠ Help | ⓒExit HSN iTV |

We have encountered a connection problem.
To complete your order, please call
HSN iTV Customer Service at 1-800-436-6464.
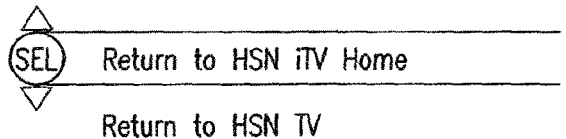
Return to HSN TV
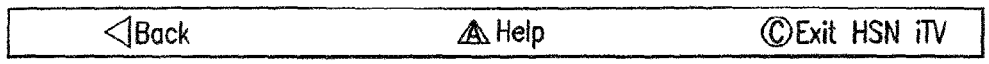
FIG.27

Please wait, calculating your order total...

(HSN)

This item is not available for sale on HSN iTV.
To order this item, please call 1-800-436-6464.

Return to HSN iTV Home
Return to HSN iTV

◁ Back     ⚠ Help     ⓒ Exit HSN iTV

METHOD AND SYSTEM FOR DISPLAYING AND UPDATING ELECTRONIC INFORMATION ON A DISPLAY DEVICE

CROSS REFERENCE TO RELATED APPLICATIONS

The present application is a continuation of U.S. application Ser. No. 12/476,145, filed Jun. 1, 2009, which is a continuation-in-part application of U.S. application Ser. No. 11/948,818, filed Nov. 30, 2007, and issued as U.S. Pat. No. 7,752,083, the entire contents of each of which are incorporated herein by reference.

FIELD OF THE INVENTION

The present invention relates generally a system and method for improved electronic shopping, and, more particularly, a system and method for updating product information presented to a customer in either real-time or on a scheduled periodic basis, based on an identified category of the particular product.

BACKGROUND

Commerce may be conducted in numerous venues. In particular, commerce may be conducted in real space or electronically, i.e., e-commerce. E-commerce is conducted via a computer network. Servers are used to store product and transaction information and computer terminals are used by purchasers to access the information stored in the server to view and modify such information via an electronic transaction.

E-commerce may also be conducted in the context of interactive television (iTV), e.g., for the purchasing of video-on-demand (VOD). For such interaction, set-top boxes may be programmed for bidirectional communication with a content provider. The set-top box may receive content from a content provider and display the received content on a television (TV) for viewing.

It is desirable to provide an improved iTV e-commerce experience for transactions with respect to products provided in real space, e.g., tactile product related transactions and/or for products that may be physically shipped to a consumer or otherwise communicated or delivered to a customer, e.g., electronically to a cell phone, handheld or personal digital assistant (PDA), other than through the TV, as with VOD programs.

In such circumstances, it is further desirable to provide information to the customers that facilitates an easy shopping experience. For example, once certain products are sold out or placed on sale, this information should be relayed to the customer as soon as possible. However, if all such information is transmitted to the set-top box of each customer on a real-time basis, the memory and processing capabilities of both the set-top boxes and the content provider may be unnecessarily burdened, resulting in a negative impact on the overall system, e.g., a slow-down in overall processing. Accordingly, it is desirable to selectively update product information that is displayed to the customer, for example, based on the particular product being marketed to the customer.

SUMMARY OF THE INVENTION

In an exemplary embodiment of the present invention, a server stores product information relating to a plurality of products classified in a first category and to a plurality of products classified in a second category. As soon the server receives transaction data relating to an electronic transaction, the server updates the product information to reflect the transaction data changes. If the updated data relates to one of the plurality of products classified in the first category, the server transmits product display information towards one or more set-top boxes in real-time. Alternatively, if the updated data relates to one of the plurality of products classified in the second category, the server transmits product display information towards one or more set-top boxes in scheduled periodic basis.

In one aspect, the present invention is directed to a method for providing an electronic shopping environment including receiving electronic digital information relating to at least one product in a first category of products and to at least one product in a second category of the products; receiving updates, on a scheduled periodic basis, to the electronic digital information relating to the at least one product in the second category to reflect electronic transactions for such at least one product conducted via a set-top box; and receiving updates to the electronic digital information relating to the at least one product in the first category, the updates received whenever an electronic transaction conducted via the set-top box affects the electronic digital information relating to the at least one product in the first category.

In another exemplary embodiment, a method for providing an electronic transactional environment, may provide for transmitting a user request from a set-top box; receiving at the set-top box a product information display responsive to the user request, the product information display including product information and order information for a product in a first category of products available for purchase and for a product in a second category of products available for purchase, at least a portion of the product information data is received from a server; displaying the product information display on a television; receiving product and order information updates for products in the first category on a real time basis and receiving product and order information updates for products in the second category on a scheduled periodic basis; displaying an updated product information display on the television; and interacting with at least one of the product information display and the updated product information display to purchase at least one of the products.

To implement the exemplary method, a communication exchange server for facilitating television based transactions is disclosed, which includes memory configured to store electronic digital information relating to at least one product in a first category of products and at least one product in a second category of the products; a first processor configured to update the electronic digital information so as to reflect electronic transactions conducted based on communications received from at least one set-top box, wherein the first processor is further configured to transmit towards the at least one set-top box the electronic digital information relating to the at least one product in the first category, such transmitting occurring triggered by updates to the electronic digital information relating to the at least one product in the first category so as to reflect transactions conducted at the at least one set-top box on a real-time basis, and wherein the first processor is further configured to transmit, on a scheduled periodic basis, towards the at least one set-top box the electronic digital information relating to the at least one product in the second category.

The exemplary communication exchange server may further include a second processor configured to generate user interface screens based on the electronic digital information, the user interface screens configured to be displayed on a television and navigable by a user to purchase at least one of the products. Moreover, in one aspect, the second processor is further configured to transmit at least one of the user interface screens to the at least one set-top box in response to a request from the at least one set-top box, and wherein the transmission by the first processor towards the set-top box is conducted via the second processor.

In a further aspect, at least one of the user interface screens includes a video regarding a product selected at the set-top-box via interaction with another of the user interface screens. Furthermore, in another aspect, the user interface screens are transmitted as an eXtensible Markup Language (XML) document.

In addition, the exemplary set-top box may further comprise a processor configured to facilitate television based transactions, such that the set-top box is configured to transmit a user request to a server and to receive from the server a product information display responsive to the user request, the product information display including product information and order information for a product in a first category of products available for purchase and for a product in a second category of products available for purchase. Furthermore, the set-top box may be configured to display the product information display on the television, to receive product and order information updates for products in the second category on a scheduled periodic basis, to receive product and order information updates for products in the first category, such updates reflecting the television based transactions conducted via the set-top box on a real-time basis, and to display one or more user interface screens on the television, the screens navigable by a user to purchase at least one of the products.

According to yet another embodiment, a method for providing an electronic shopping environment, may provide storing electronic digital information relating to at least one product in a first category of products and to at least one product in a second category of the products; transmitting towards a set-top box, on a scheduled periodic basis, the electronic digital information relating to the at least one product in the second category; and transmitting towards the set-top box the electronic digital information relating to the at least one product in the first category and retransmitting whenever there is an update to such electronic digital information so as to reflect, in a real-time basis, electronic transactions conducted via the set-top box involving the at least one product in the first category.

In an aspect of this exemplary method, a first server stores the electronic digital information and the transmitting is conducted through the first server and a second server in communication with the first server. In a further refinement, the electronic digital information is configured to be incorporated into a plurality of user interface screens, wherein said plurality of user interface screens has a first portion adapted for user interaction to conduct the electronic transactions.

In addition, the foregoing exemplary methods and systems may further provide that at least one product in the first category is the subject of a live broadcast feed in which features of such at least one product are discussed. Moreover, in the exemplary methods and systems, the product information display includes a video relating to products that are not the subject of the live broadcast feed.

According to another embodiment, the present invention is directed to a method for providing an electronic transactional environment, the method comprising: transmitting a user request; in a single transmission and in response to the user request, receiving product information data for a product information display spanning multiple navigable pages, the product information display including product information and order information for a product available for purchase, the product information data including a first portion for display of an initial page and a second portion for display of another page and not for use for the display of the initial page, wherein at least a portion of the displays is on a television and at least a portion of the product information data is transmitted from a server; based on the first portion, displaying the initial page; transmitting a navigation command to the server; responsive to the navigation command and based on the second portion, displaying the another page; receiving a display update from the server subsequent to the single transmission; automatically refreshing a currently displayed page by replacing data on the displayed page with data from the display update; interacting with the displays to conduct a transaction; requesting confirmation that the product information data related to the transaction is up-to-date prior to finalizing the transaction.

In another aspect, this exemplary method comprises receiving an updated virtual shopping basket, based on input received from the user during a navigation of the navigable pages, to virtually include the product; and receiving a price update included in the display update, the price update customized to the user and based at least in part on a state of the virtual shopping basket.

According to another embodiment, the present invention is directed to a system for providing an electronic transactional environment, comprising: a server storing product information data and configured to transmit towards a set-top box in a single transmission and in response to a user request the product information data for a product information display on a television, the product information display spanning multiple navigable pages, configured to be controlled by the set-top box, and including product information and order information for a product available for purchase, the product information data spanning multiple navigable pages, the product information data including a first portion for display of an initial page and a second portion for display of another page and not for use for the display of the initial page; the server is updated on a continuous basis to reflect transactions as they occur, the transactions performed via interaction by a user with television displays generated based on the product information; the server is configured to transmit to the set-top box update data for generating a display update to reflect the transactions; the display of the initial page configured to be replaced with the display of the another page in response to a navigation command from a user of the set-top box.

The system may further provide that the product information stored at the server is updated on a real-time basis to reflect transactions performed at least one of in (i) real space, (ii) via the Internet, and (iii) via an Interactive Voice Response (IVR) system.

In another aspect, the product information data includes a price for the product and the display update includes an updated price for the product, at least one of the price and the updated price of the product customized to the user and based at least in part on transactions by the user conducted external to the transactions performed via interaction by the user with the displays.

In yet another aspect, the single transmission further includes navigation instructions controlling which particular portion of the product information data is displayed on the television at any particular time, and where on the television each part of the particular portion is displayed.

Furthermore, the exemplary system may further comprise a set-top box that is configured to (i) control a display of a television, (ii) to receive the product information data, (iii) to receive program data from a content provider, and (iv) to communicate with the input device for input by the user of commands to the set-top box. In a further aspect, the set-top box is configured to: based on the first portion, display the initial page on the television; responsive to a navigation command from the input device and based on the second portion, display the another page on the television; receive the update data in a transmission subsequent to the single transmission; and refresh a currently displayed page generated based on the product information data received in the single transmission by replacing data on the displayed page with data from the update data; wherein the system is configured to finalize transactions performed via user-interaction with the displays displayed on the television by the set-top box; and the server is updated to reflect the finalized transactions as soon as they occur.

In another aspect, the system provides that the server transmits the single transmission in response to a user request after the product available for purchase is the subject of a live television program.

According to another embodiment, a system for providing an electronic transactional environment is provide, which comprises: a remote control; and a set-top box configured to: (i) control a display of a television, the set-top box communicating with the remote control for input by a user of commands to the set-top box; (ii) receive program data from a content provider, (iii) receive from a server, in a single transmission and in response to a user request communicated via the remote control, product information data for a product information display on the television to be controlled by the set-top box spanning multiple navigable pages, the product information display including product information and order information for a product available for purchase, the product information data spanning multiple navigable pages, the product information data including a first portion for display of an initial page and a second portion for display of another page and not for use for the display of the initial page; the transactions performed via interaction by the user with television displays using the remote control, the television displays generated based on the product information; (iv) based on the first portion, display the initial page on the television; (v) responsive to a navigation command from the remote control and based on the second portion, display the another page on the television; (vi) receive update data from the server in a transmission subsequent to the single transmission; and (vii) refresh a currently displayed page generated based on the product information data received in the single transmission by replacing data on the displayed page with data from the update data; wherein the system is configured to finalize transactions performed via user-interaction with the displays displayed on the television by the set-top box.

In another aspect of this system, the set-top box is configured to receive from the remote control a shopping session initiation instruction and, responsive to the instruction, transmit towards the server a request for the product information data, the single transmission responsive to the request and addressed to the set-top box. Furthermore, in one embodiment, the set top box is part of the television.

Reference throughout this specification to "an embodiment" or "one embodiment" or "an exemplary embodiment" means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

An example embodiment of the present invention is described in more detail below with reference to the appended Figures. The foregoing description and examples have been set forth as mere illustrations and are not intended to be limiting. Each of the disclosed aspects and embodiments may be considered individually or in combination with other aspects, embodiments, and variations thereof. The steps of the methods described herein are not confined to any particular order of performance.

BRIEF DESCRIPTION OF THE DRAWINGS

FIG. 3 illustrates screenshots corresponding to states between which a routine may loop for inviting a user to begin a shopping session, according to an exemplary embodiment of the present invention.

FIGS. 5 to 29 illustrate additional screenshots that may be provided for display on a television during a shopping session, according to exemplary embodiments of the present invention.

DETAILED DESCRIPTION

Figure 1:
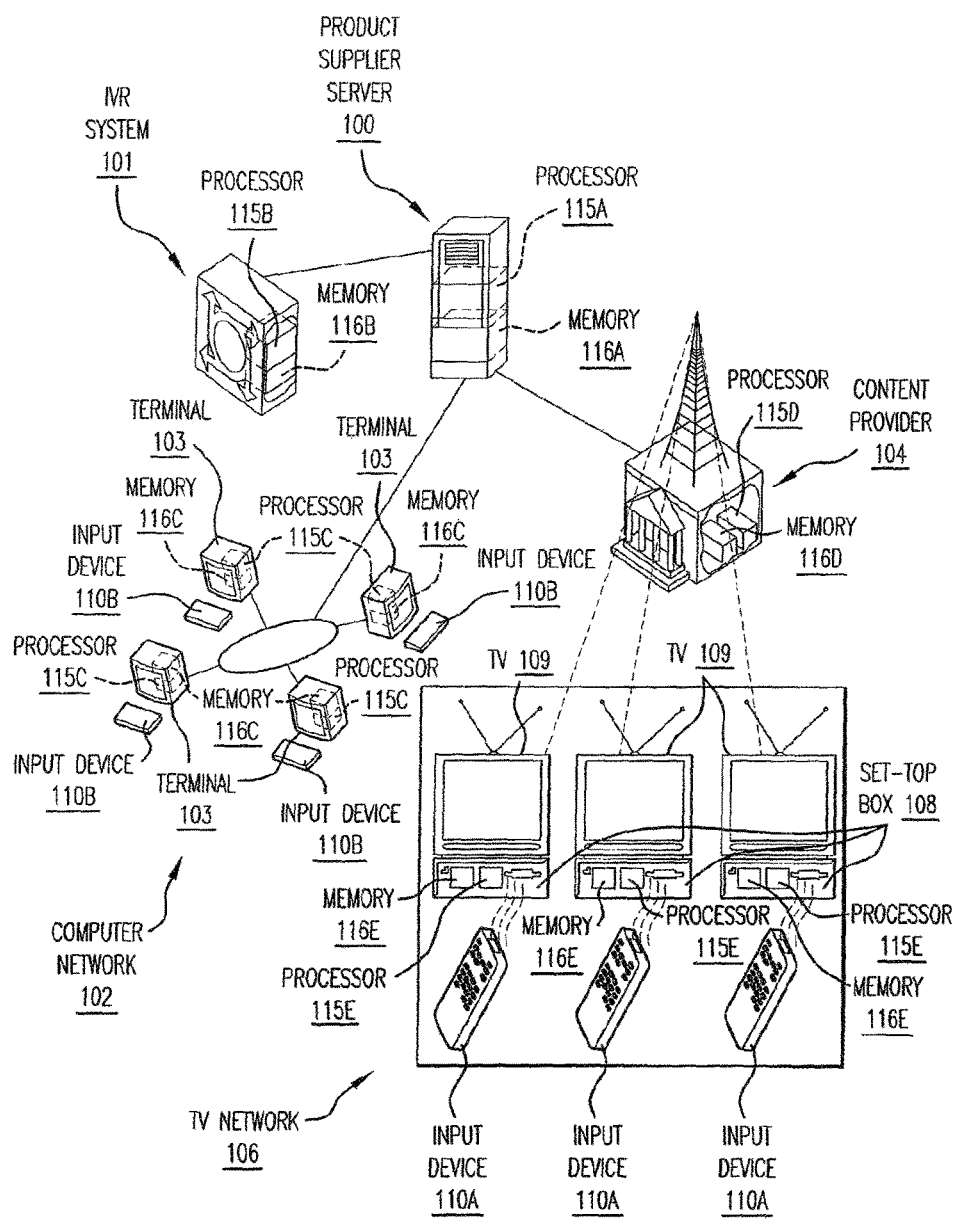
FIG. 1 is a block diagram that illustrates components of a system according to an exemplary embodiment of the present invention.

FIG. 1 is a block diagram that illustrates exemplary components of a system according to an example embodiment of the present invention. The system may include a product supplier server 100, an IVR system 101, a computer terminal network 102, a content provider 104, and a television network 106 including a plurality of set-top boxes 108, each of which is associated with a corresponding TV 109 and corresponding input device 110A, such as a remote control. The set-top boxes 108, although illustrated as separate units, may take on any form provided they function to render content on TV 109. For example, set-top boxes 108 may be software based or hardware based home terminals separate from or integrated with their corresponding TVs 109. The product supplier server 100 may include information regarding products and customers. In one exemplary embodiment of the present invention, each of the IVR system 101, the computer terminal network 102, and the content provider 104 may be in communication with the product supplier server 100 and may input, modify, and retrieve data of the product supplier server 100.

Each of the server 100, IVR system 101, terminals 103 of the computer terminal network 102, content provider 104, and set-top-boxes 108 may be controlled by a corresponding processor(s) 115A-E, respectively (collectively referred to herein as processor 115). The processor 115 may be any one or combination of suitably appropriate processing systems, such as, for example, a microprocessor, a digital signal processor, and a field programmable logic array. The processing system may be embodied as any suitably appropriate computing device, e.g., a computer, PDA, laptop computer, notebook computer, a hard-drive based device, or any device that can receive, send, and store data. For the control, the processors 115 may execute program instructions. Some of such instructions may be pre-installed or manually loaded over time. Others may be transmitted between the different system components. Program instructions may be in any suitable form. In particular, some or all of the instructions may be provided in programs written in a self-describing computer language, e.g., Hyper Text Markup Language (HTML) or eXtensible Markup Language (XML). Transmitted program instructions may be used in combination with other previously installed instructions, e.g., for controlling a manner of display of data items described in a received program markup sheet.

Each of the server 100, IVR system 101, terminals 103 of the computer terminal network 102, content provider 104, and set-top-boxes 108 may include or be in communication with memories 116A-E, respectively (collectively referred to herein as memory 116), for storing data and/or program instructions. The memory 116 may include any combination of memory circuits, including electrical, magnetic, and/or optical systems. The memory 116 may include, for example, read only memory (ROM), random access memory (RAM), and/or bulk memory.

While only the IVR system 101, computer terminal network 102, and television network 106 are explicitly discussed, other conduits via which to conduct transactions may be included in the system and may be in communication with the content provider 104 server 100 for data retrieval and update. While only one content provider 104 is shown in FIG. 1, a plurality of content providers may be connected to the product supplier server 100. Similarly, while only an input device 110A embodied as a remote control is shown in FIG. 1, the input device 110A may be embodied as any suitably appropriate input device 110A, e.g., a keyboard or keypad, such as one integrated with a TV 109 or a touch screen of the TV 109. Further, while only input devices 110A associated with set-top boxes 108 are discussed, other input devices 110 may be similarly provided for other terminals, such as input devices 110B for terminals 103 of the computer terminal network 102.

The computer terminal network 102 may include terminals 103. A product supplier's employees, for example, may use terminals 103 to conduct transactions in real space and access the product supplier server 100 to retrieve product and customer information for conducting the transactions and to update data to reflect the performed transactions. Terminals 103 may also operated by customers, e.g., who may connect to the product supplier server 100 (or another server 100 that is connected to the product supplier server 100) via the Internet, to conduct transactions. The data of the product supplier server 100 may be manually or automatically updated based on the conducted transactions.

Similarly, the IVR system 101 may be connected to the product supplier server 100 for retrieval of data from the server 100 to provide, e.g., product information, to a customer who logs into the IVR system 101, and for automatic updates to the data of the product supplier server 100 based on a conducted transaction, or based on new customer information.

The content provider 104 may transmit program content pertaining to the product supplier's products to a set-top box 108, receive from the server 100 and transmit to the set-top box 108 product and/or customer information, and receive from the set-top box 108 and transmit to the server 100 user transaction interaction information. The set-top box 108 may render content received from the content provider 104 for display on a user's TV 109, receive commands from the user, e.g., via the user's input into the corresponding input device 110A, such as a remote control, touch screen, and/or keypad, transmit information to the content provider 104 in response to some of the user commands, and change the television display in response to the same or other of the user commands.

In an example embodiment of the present invention, product information of the product supplier server 100 that is displayed on a user's TV 109 by the user's set-top box 108 based on data received from the content provider 104 may reflect a real-time product state as determined by a combination of transactions conducted via each of the computer terminal network 102, the IVR system 101, and the television network 106 (and any other conduit in communication with the content provider 104 server 100 and via which transactions may be processed) and for which information is updated at the supplier server 100 as soon as a transaction is processed.

In an example embodiment of the present invention, content to be provided in multiple display pages (or frames) may be provided to the set-top box 108 during multiple communications from the product supplier server 100 to the set-top box 108 via the content provider 104.

Alternatively, content to be provided in multiple display pages (or frames) may be provided to the set-top box 108 during a single communication from the product supplier server 100 to the set-top box 108 via the content provider 104. For example, the data of the single communication may include data based on which a plurality, e.g., all, of the product information display pages of a shopping session may be generated. The content provider 104 may forward the request to the product supplier server 100. The product supplier server 100 may generate a file, e.g., an XML document, which includes data concerning relevant products. The single file may include navigation information and product descriptors for display, e.g., over multiple pages between which the user may navigate via input entered into the remote control 110A for control of the set-top box 108. In one example embodiment, some or all of the navigable pages may be displayed on the TV and/or on a display of the remote control 110A. The single file transmission allows the user to navigate the pages in a real-time uninterrupted manner with minimal delay navigating between pages. As explained below, however, even according to the embodiment in which all of the navigable pages and associated data are transmitted in a single file, all or portions of the product information data may be re-transmitted during the shopping session to keep the navigable pages current. For example, when a user begins a transaction session, the set-top box 108 may transmit to the content provider 104 a request for product information. Any data updates may be used to replace outdated data in the navigable pages, for example, without replacing the entirety of the navigable page.

In an alternative example embodiment, the navigation information may be predetermined and programmed into the set-top box 108 for universal application to all or a plurality of files, e.g., of a predetermined type, to be sent to the set-top box 108. In one example embodiment, the set-top box 108 may be periodically updated (on a set schedule or otherwise)

with navigation updates. According to the embodiment in which the set-top box 108 is programmed with predetermined navigation information, the product information file may include the product descriptors for display over the multiple pages, without navigation information. The set-top box 108 may interpret the product descriptors in light of the preprogrammed navigation information. In one example embodiment, some navigation information may be transmitted together with the product information data, while other navigation information, e.g., universally applied navigation information, may be preprogrammed at the set-top box 108.

According to any of the above embodiments, after receiving the file from the content provider 104, the set-top box 108 may display an initial page of product information determined based on the combination of the received product information and the navigation information. Based on the combination of the navigation and product information, the set-top box 108 may interpret a command received from the remote control 110A while the initial page is displayed as a command to generate and display another page of product information, including other product information provided in the single file. The procedure may be repeated along multiple navigation paths from one page to another. Accordingly, the navigation between the multiple pages of product information may be based on the single file received in response to the communication to the product supplier server 100 made by the set-top box 108 at the beginning of the transaction session.

The user may press a help button, e.g., towards the bottom of the display, for assistance. A screen explaining the interactive purchasing process, e.g., as shown in FIGS. 21 to 23, may then appear on the screen one at a time depending on selections by the user.

An example application of preprogrammed navigation information to product information received in the single file may be where different products are associated with different sets of attributes. Some of the navigation information may be applicable to products having certain attributes, but not to other products that do not have those attributes. For example, navigation information may provide for interpreting input received by the set-top box 108 as a command to proceed to another page in the navigation sequence that displays a list of selectable colors. This page may be displayed for those products having a color selection attribute, e.g., those products that come in different colors, but not for those products that do not have a color selection attribute, e.g., those products that come in only one color. Thus, the particular navigation sequence that may be traversed by the user may be based on the combination of the preprogrammed navigation information and the product information received in the single file. The product supplier server 100 may provide product information by generating and transmitting an XML document including metadata labels for one or more data items. A non-exhaustive list of the data items may include position information, image information (e.g., for display of thumbnail), product description, price, size(s), color(s), style(s), and flex pay (e.g., indicating a payment option). Of the listed data items, some may be applicable to some products but not to other products.

In an example embodiment of the present invention, product information updates may be transmitted to the user's set-top box 108 as they occur for display in a real-time manner, with respect to attributes such as those of a non-exhaustive list including price, availability, options, and customer-specific rebates. The rebates may be used to modify the price provided to the user. The rebates may be provided based on a customer transaction history including a combination of the customer's TV shopping session, IVR system 101, computer network terminal 103, and real space transaction histories. The shopping session history may be recorded by the set-top box 108 and may include an indication of all products and corresponding quantities added to a virtual session basket. To ensure that a real-time price based on the combination of histories is provided to the customer conducting a TV transaction, a call from the set-top box 108 to the product supplier server 100 via the content provider 104 requesting an updated price may be made when the customer indicates the customer's readiness to complete a transaction. The price returned in response to the call may incorporate a rebate based on a transaction entered into by the user in a venue other than the current interactive TV shopping session, e.g., concurrent with the current interactive TV shopping session.

In one example embodiment, the set-top box 108 may transmit the session history to the product supplier server 100. The server 100 may then generate a customer price based on the history combination, including the session history. In an alternative example embodiment, the set-top box 108 may transmit a price call to the server 100 without the session history. The set-top box 108 may return a customized price based on the history combination excluding the session history. Based on conditions, e.g., with which the set-top box 108 is preprogrammed or that the set-top box 108 previously received from the content provider 104 or received with the customized price, the set-top box 108 may update the customized price to reflect the locally stored session history.

In an example embodiment of the present invention, after a first transmittal of a shopping session from the product supplier server 100 ultimately to the set-top box 108, which is in response to a request for information by the set-top box 108, the product supplier server 100 may re-transmit to the set-top box 108, without further request by the set-top box 108, product information during the shopping session. Such unprovoked transmissions by the set-top box 108 are referred to herein as a data push. In one example embodiment, the re-transmission may be periodic, e.g., at set intervals, regardless of changes to the product information. In an alternative example embodiment, the re-transmission may be selectively performed responsive to changes to the product information. In one example embodiment, a data push may include an entirely new set of data including the changes. In an alternative example embodiment, a data push made in response to a change may include only the changes, so that the set-top box 108 can update the displays and navigation based on a combination of the previously received data and the subsequent data push.

In one example embodiment, the re-transmissions may be similarly performed with respect to set-top specific data. For example, customized pricing, as explained above, may be included in the product information.

In one example embodiment, aside from certain customized transmissions of data by the product supplier server 100 to the set-top box 108, e.g., the transmission responsive to the call towards an end of a shopping session, the data transmissions may be broadcast to all set-top boxes 108. For example, the product supplier server 100 may transmit the product information periodically to the content provider 104 for broadcasting of the product information to all set-top boxes 108. (The initial transmission path of the data from the product supplier may be to a single or multiple content providers 104. However, the data may be transmitted without addressing any particular set-top box 108. In this way, the transmission may be considered a broadcast, even where it is to a single content provider 104.)

In one variant of this embodiment, with respect to a shopping session of a set-top box 108, the first transmission by the product supplier server 100 to the set-top box 108 may be responsive to a request by the set-top box 108, so that a delay does not occur at the set-top box 108 while waiting for a first transmission of the session, which may otherwise occur if the set-top box 108 waits for broadcast data. Subsequent transmissions may be broadcast transmissions, e.g., except for transmissions of customized data and/or transmissions to subsequent requests made by the set-top box 108. Such subsequent requests may be, e.g., because of data corruption perceived by the set-top box 108. Any suitable method of data corruption detection may be performed by the set-top box 108.

In one example embodiment, after receipt by the set-top box 108 of the first transmission from the product supplier server 100, the set-top box 108 may render the data for display at the set-top box 108's corresponding TV 109. In response to commands received from the user, the set-top box 108 may change the display in a manner representing navigation between multiple pages. If a data push is received by the set-top box 108 while a page is displayed, the set-top box 108 may dynamically change the display of the page in accordance with new information concerning the page that is included in the product push. For example, if a color options page is displayed that shows five color options when a data push is received that indicates that one of those options is no longer available, the set-top box 108 may dynamically update the display, even without receipt of any command from the user, to reflect the change in the color options. For example, the page may be updated so that one of the color options is removed from the display or so that one of the color options is displayed in a manner that indicates its unavailability, e.g., by being ghosted or by including a mark, such as "sold out" or "unavailable."

In one example embodiment, whether or not the set-top box 108 dynamically changes the display may depend on satisfaction of conditions of a rule set. For example, rule set may provide conditions that to ensure or tend to ensure that the display change is not perceived by a user as a disruption to the shopping session. For example, a first transmission of product information may include data interpreted by the set-top box 108 as requiring a separate page of color options. A second transmission of product information may include modified data interpreted by the set-top box 108 as not including a separate color options page, e.g., where the modified data indicates that the product comes in only one color. If, prior to receipt of the second transmission, the user had navigated to the color options page of the first transmission so that the color options page is still displayed at receipt of the second transmission, dynamic modification of the displayed page might entail a perceived disruption in the navigation. For example, a dynamic modification might include removing the currently displayed page (since the second transmission does not include the displayed page) and displaying an earlier (with respect to the navigation sequence) page, e.g., the first page of the shopping session. Such a modification may be perceived as a disruption. The rule set may therefore provide for dynamically updating the display conditional upon the continuance of the display of the page displayed at time of transmission (or a slightly later time to account for processing time). The set-top box 108 may be preprogrammed with the rule set and/or may receive the rule set or rule set updates with the transmissions from the product supplier set-top box 108. In one example embodiment, the content provider 104 may be the source of the rule set, rather than the product supplier server 100.

Figure 2A:
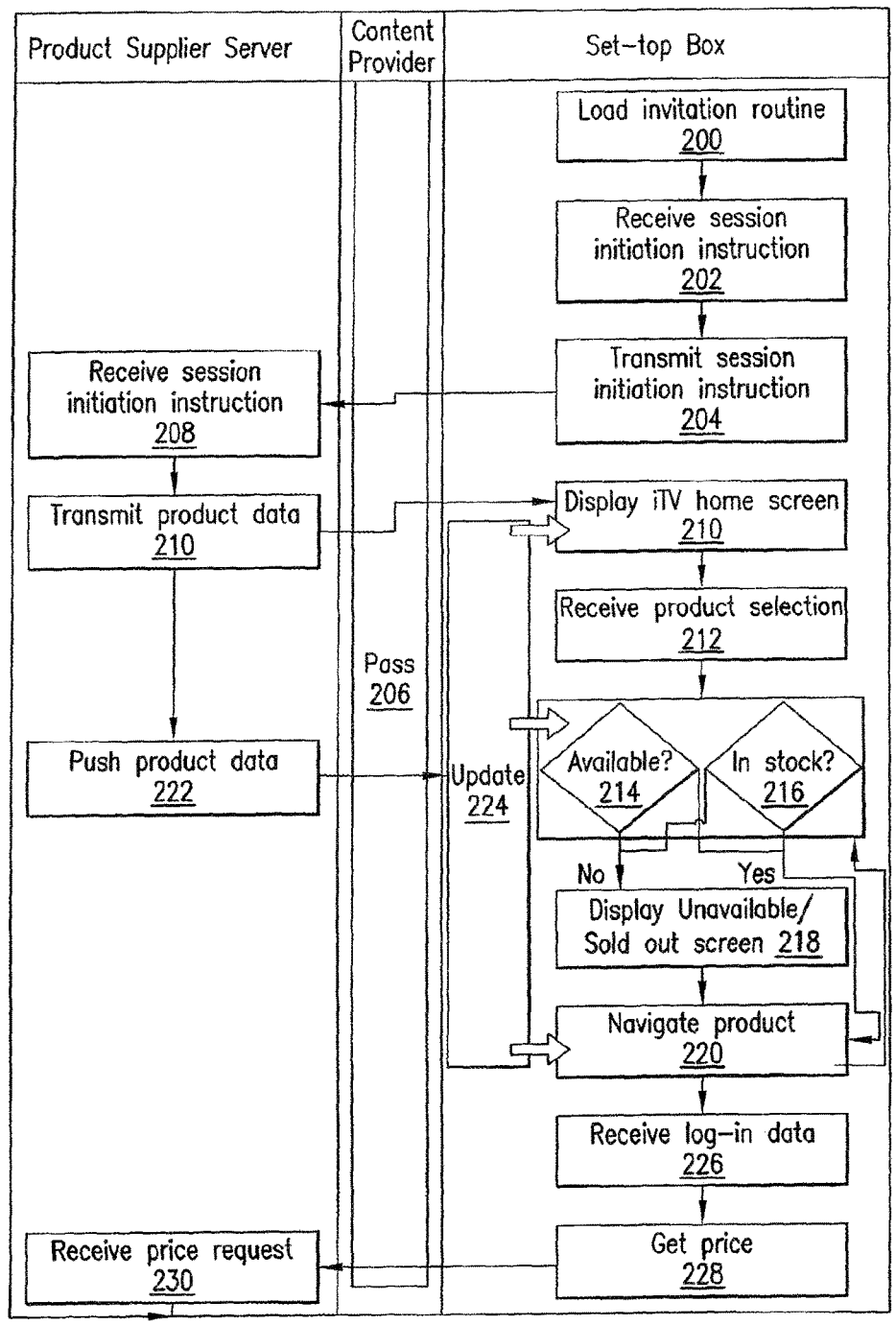
FIGS. 2A and 2B (collectively FIG. 2) is a cross-functional flowchart that illustrates a method for providing real-time TV e-commerce according to an exemplary embodiment of the present invention.
Figure 2B:
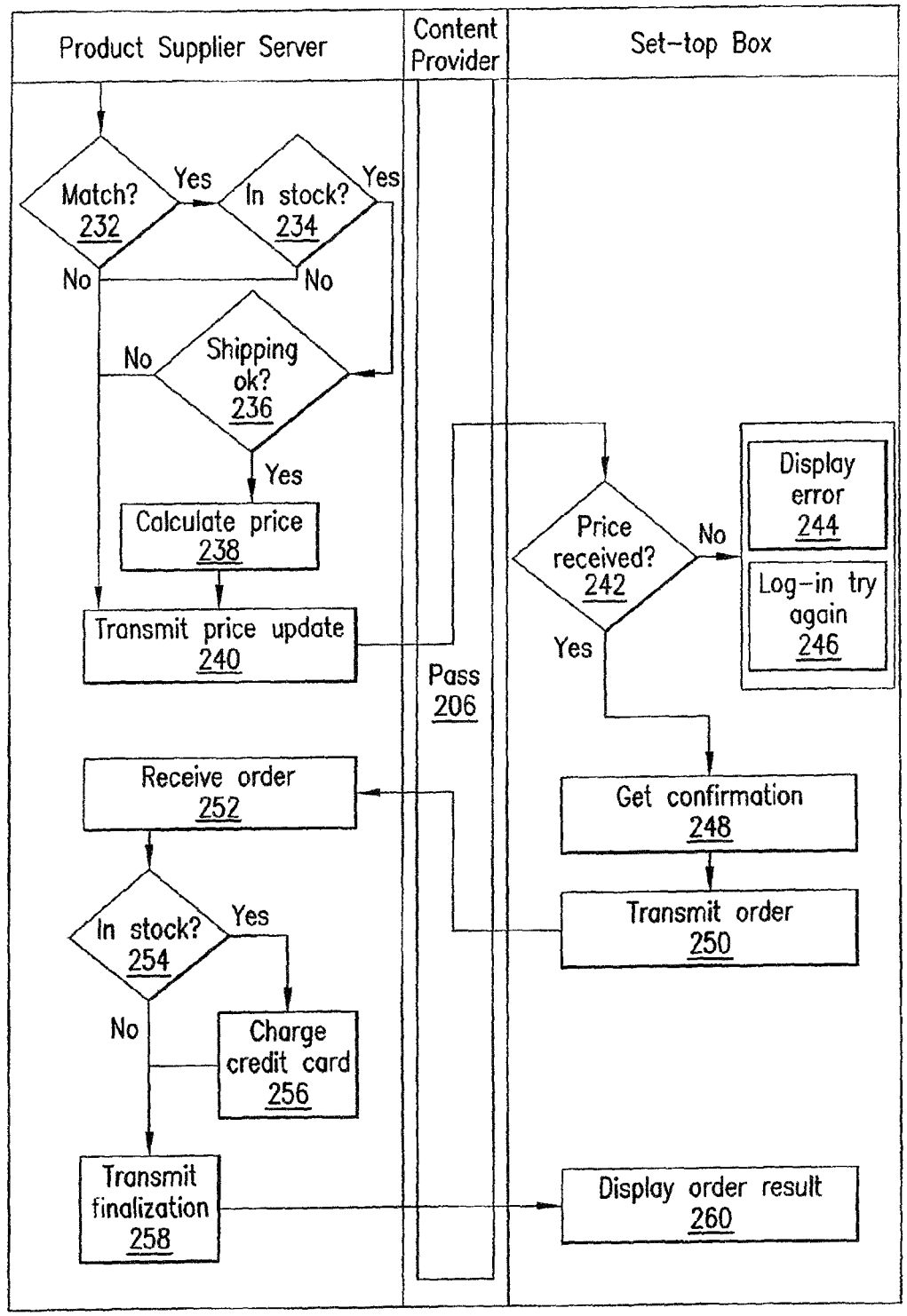

FIG. 2 (which is divided into FIGS. 2A-2B) is a flowchart that illustrates an exemplary flow across the product supplier server 100, content provider 104, and set-top box 108 for performing a real-time processing method for TV e-commerce. According to this exemplary embodiment, products of an iTV shopping channel, i.e., a channel that may be used as a portal to begin a shopping session, may be categorized into one or more of four categories. The categories may include a "currently on air" category, a "today's special" category, a "this day only" category, and a "most recently aired product" category. The currently on air product may be one that is featured on the channel's program at the time. The today's special product may be one that features a special price. The this day only product may be one that is presently thought by the product supplier to be available for only the present day. The most recently aired product may be a product aired prior to the currently on air product. The most recently on air product category may include a plurality of sub-categories. A first sub-category may be the immediately preceding on air product category. A second sub-category may be the second to most recently on air product, etc.

After a user instructs the set-top box 108 to tune to the iTV channel, the set-top box 108 may automatically display an instruction for initiating the shopping session. At 200, an invitation-to-shop routine may be automatically loaded upon tuning to the channel. For example, the set-top box 108 may be preprogrammed to auto-load the routine. Alternatively, the content provider 104 may transmit instructions to the set-top box 108, which, when executed by the set-top box 108, cause the set-top box 108 to load the routine. The invitation-to-shop routine may, e.g., loop between two display states (states 1 and 2), illustrated, respectively, in parts (a) and (b) of FIG. 3. In the first display state, a long versioned instruction, which states "Press select on your remote to shop," may be displayed. In the second display state, a short versioned instruction, which states "Press select to shop," may be displayed. In one example embodiment, the routine may loop between the two display states and off state in which no instruction is displayed.

Figure 5:
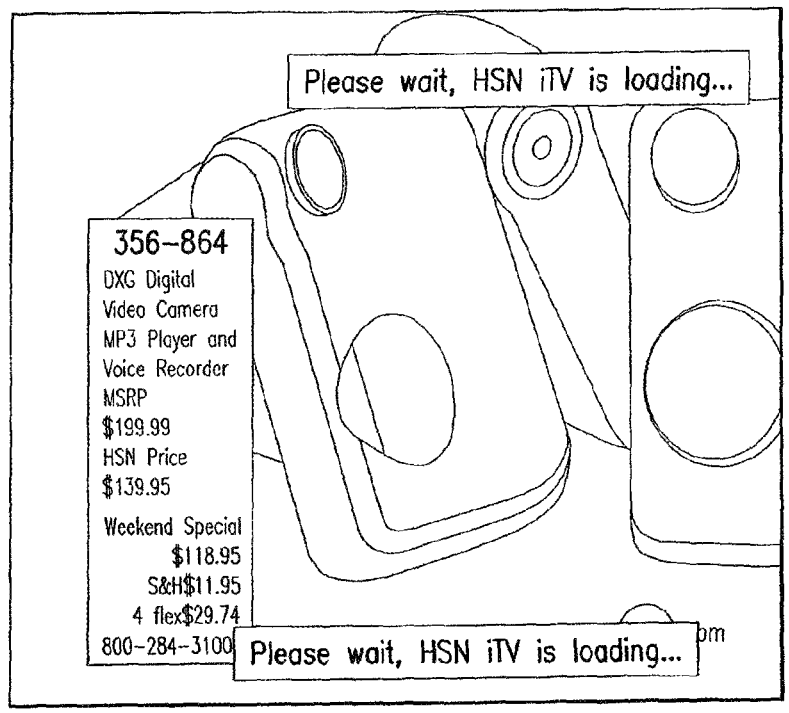

At 202, the set-top box 108 may receive a session initiation instruction from the user, e.g., via the remote control 110A. In response to the instruction, the set-top box 108 may perform a routine(s) for loading a session. In one exemplary embodiment, during loading of the session, the set-top box 108 may overlay on the display a message indicating that the session is being loaded, e.g., as shown in FIG. 5.

The routines for loading the session may include transmitting, at 204, a session initiation instruction to the content provider 104. The content provider 104, in turn, may, at 206, pass on the instruction by making a call to the product supplier server 100. As indicated above, in one exemplary embodiment, information used for providing a shopping session to the user may be periodically broadcast by the product supplier server 100 to the content provider(s) 104 without addressing any particular set-top box 108. According to this embodiment, a call to the product supplier server 100 may be omitted. The content provider 104 may handle the session initiation on its own by passing on the information to the set-top box 108. In yet another alternative embodiment, the content provider 104 may pass the periodically received broadcasts to the set-top box 108 without receipt of a request therefor from the set-top box 108.

However, such unprovoked transmissions to set-top boxes 108 may be omitted so as not to cause a memory burden to the set-top boxes 108.

At 208, the product supplier server 100 may receive the session initiation instruction. At 210, the product supplier server 100 may transmit product data, e.g., in an XML document. The product data may include the currently on air product, the today's special product, the this day only product category, and/or the most recently aired products. According to one exemplary embodiment, the number of products about which data is transmitted may be limited to four. According to one exemplary embodiment, data about the two most recently aired products may be transmitted. According to one exemplary embodiment, data about the this day only product may be transmitted conditional upon an unavailability of a today's special product. According to one exemplary embodiment, if no more than a single product is associated with the combination of the on air, today's special, and this day only product categories, data about the three most recently on air products may be transmitted. If, there is also no presently on air product, data about the four most recently on air product may be transmitted. In one exemplary embodiment data of the most recently on air products that are still available may be transmitted. In an alternative embodiment, data of the most recently on air product may be transmitted regardless of present availability. The discussed precise number and types of products about which data is transmitted are exemplary.

Figure 25:
Figure 26:

Initiation of shopping sessions may be suspended at times. For example, at times, the product supplier server 100 may be temporarily shut down for maintenance. In these instances, transmissions of the product data by the product supplier may be suspended. When the transmissions are suspended, the set-top box 108 may receive an indication of the transmission suspension or may determine that the transmission suspension after a time-out from a time of transmitting a request for data (or from a previous receipt of the data, e.g., depending on whether the implemented embodiment is one that provides for the non-provoked data broadcasts, instead of responses to requests). If shopping sessions are unavailable, the set-top box 108 may display a message indicating the unavailability, e.g., as shown in FIGS. 25 to 27, in response to the user's instruction to initiate a session.

At 206, the content provider 104 may receive the data transmitted by the product supplier server 100 and transmit the data to the set-top box 108. At 210, the set-top box 108 may display an iTV home screen page based on the received data for display of information concerning the products described in the received data. The way in which the information is displayed may be in accordance with a rule set with which the set-top box 108 is preprogrammed or that is received with the product data.

Figure 4:
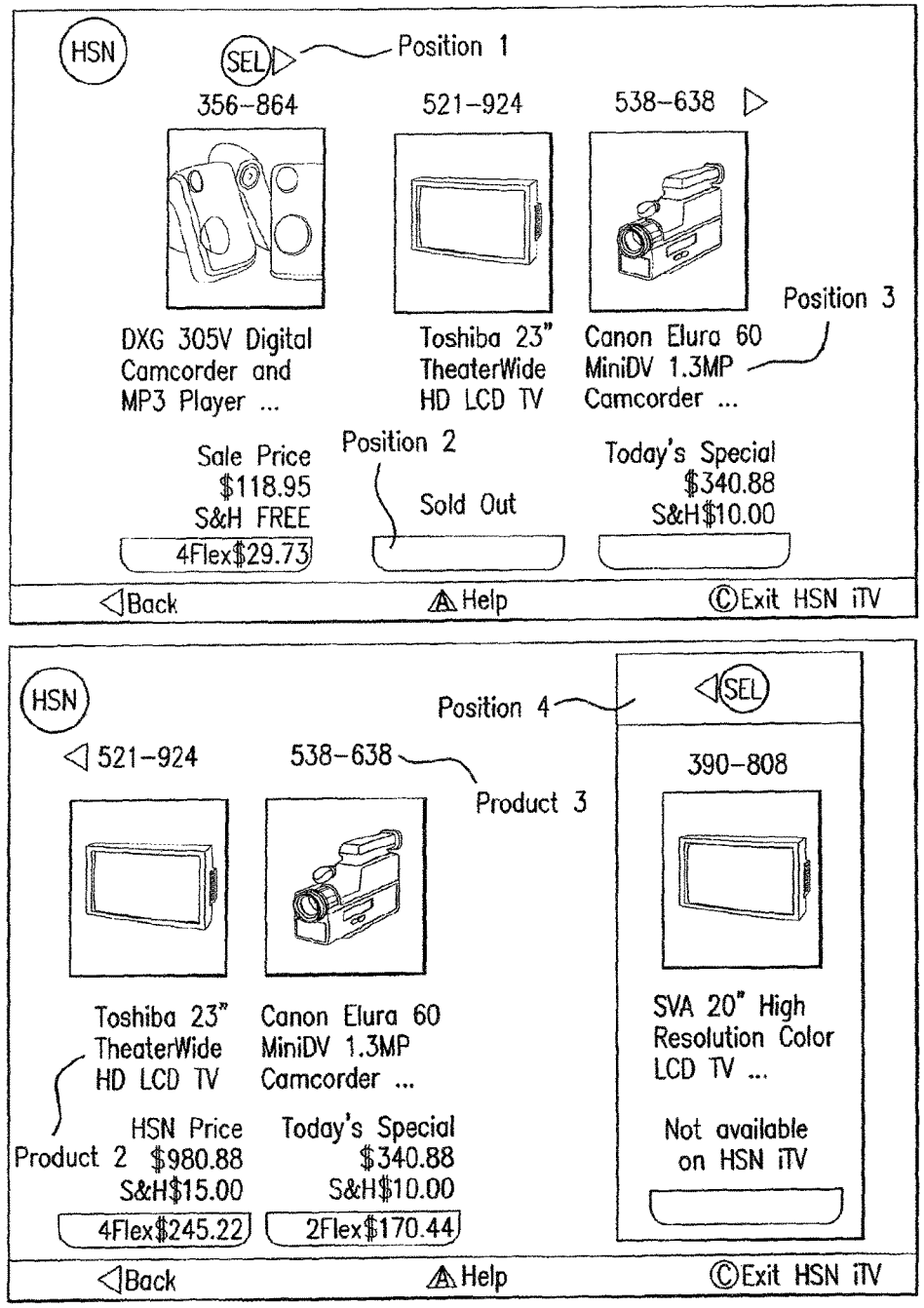
FIG. 4 illustrates iTV home screenshots that may be provided and dynamically changed, according to an exemplary embodiment of the present invention.

For example, the rule set may provide that information about only three products is to be simultaneously displayed. For display of information about a fourth product, a scrolling feature may be provided. For example, part (a) of FIG. 4 shows a screen shot of representations of a first three products and an arrow at the top right of the right-most of the representations of the three products, indicating that the user may scroll right for display of a representation of a fourth product. In response to input of a scrolling command, e.g., a right arrow of the remote control 110A, the set-top box 108, may shift the display so that the screen appears as is shown in part (b) of FIG. 4. The screen shot shown in part (b) of FIG. 4 is of representations of the last three products, the representation of the first product (the left-most product) having been removed. The screen shot also shows the arrow at the top left of the left-most of the representations of the three products, indicating that the user may scroll left for display of the representation of the first product. In response to operation of a scrolling instruction, the set-top box 108 may shift the activation of a page link of a first product representation to a following displayed product representation, until a page link of a last displayed product representation is displayed. In response to a subsequent scrolling instruction in the same direction, the set-top box 108 may shift the displayed representations as described and activate the page link of the newly added product representation. The set-top box 108 may indicate which representation's link is activated by highlighting the representation. For example, if the set-top box 108 receives a scrolling instruction to the right when the right-most representation of the screen shot shown in part (a) of FIG. 4 is highlighted, the set-top box 108 may display the screen shot shown in part (b) of FIG. 4, with the left-most product representation highlighted.

The rule set may provide that of the four product representations, the representation at position 1 should correspond to the currently on air product (if available), the representation at position 2 should correspond to the last most recently on air product, the representation at position 3 should correspond to the today's special product (if available), and the representation at position 4 should correspond to the second most recently on air product. If the today's special and currently on air products are one and the same, the rule set may provide for display of the product representation at position 1. If the product is no longer the on air product, but is the most recently on air product, the rule set may provide for display of the product representation at position 2. If it is the second to most recently on air product, third to most recently product, etc., then the rule set may provide for display of the product representation at position 3, the today's special position. The described rules of the rule set are exemplary.

At 212, the set-top box 108 may receive a product selection. For example, a product selection may be a signal received when the user presses a select button of the remote control 110A while a product representation is highlighted, i.e., the page link of the product representation is activated. In response to the selection, the set-top box 108 may, at 220, provide for navigation of multiple pages relating to the highlighted product. The navigation may include initially proceeding to a page associated with the activated link of the iTV home screen. The navigation may be performed based on the data transmitted at 210 and based on which the iTV home screen was displayed at 210.

Figure 6:
Figure 7:
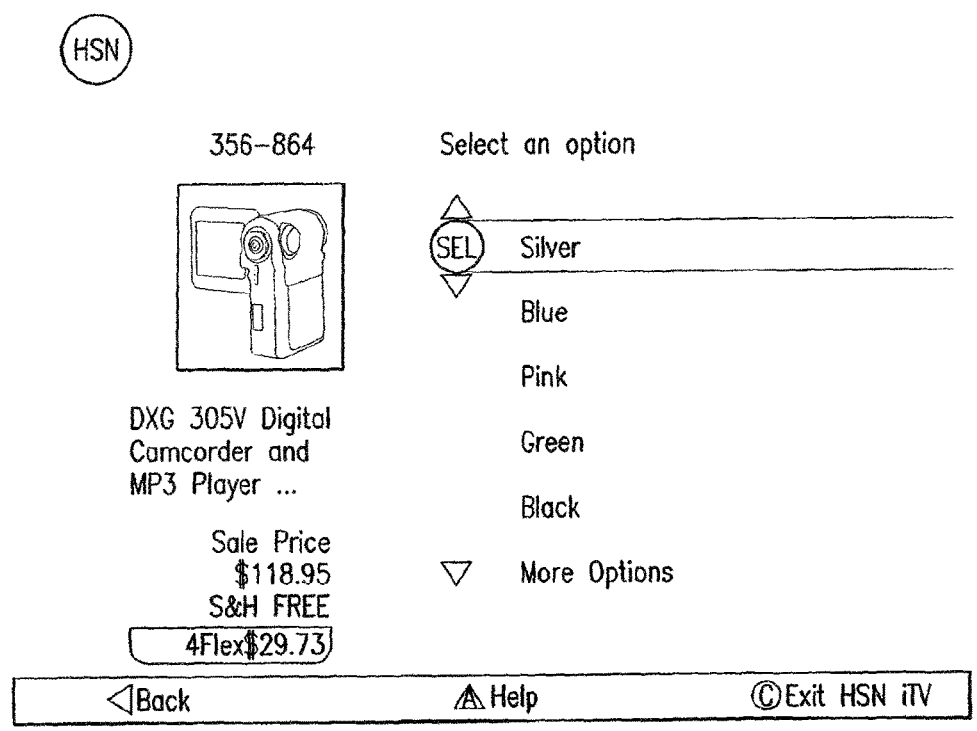
Figure 8:
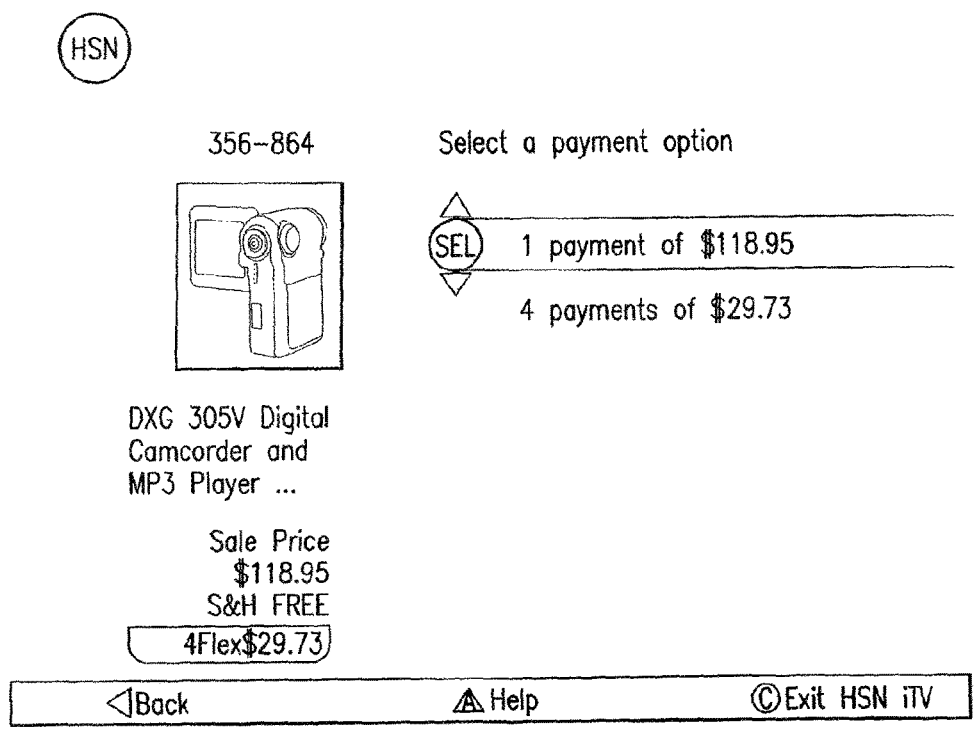
Figure 9:
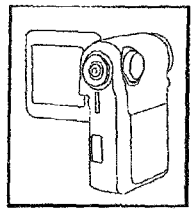

Navigation may be between a non-exhaustive list of pages that includes a product matrix page for selection of one of a plurality of product versions, e.g., as shown in FIG. 6, a color selection page, e.g., as shown in FIG. 7, a style selection page, a size selection page, a warranty selection page, e.g., as shown in FIG. 9, a quantity selection page, e.g., as shown in FIG. 10, and/or a payment options page, e.g., as shown in FIG. 8. The particular pages between which the user may navigate may depend of the product being navigated.

At 222, the product supplier server 100 may perform product data pushes, which may be performed periodically, e.g., at set intervals or as soon as the data is updated. The pushed product data may be received by the content provider 104 and transmitted to the set-top box 108. The set-top box 108 may, at 224, update the presently rendered display, e.g., the iTV home screen or another page to which the user has navigated, or information upon which the display to be rendered in the session is based, e.g., so that the allowed navigation or the information to be provided in the navigable pages is changed. For example, if both the home screen is displayed when the new data is received and the new data provides for a different home screen than the displayed home screen, the set-top box 108 may dynamically update the display to reflect the change. For example, the product for which a representation is displayed at position 1 might be indicated in the new data to be a most recently on air product, rather than the currently on air product. Accordingly, the set-top box 108 may move the representation to position 2 and may provide a representation of another product indicated to be the currently on air product in position 1. Similarly, the representation of the product in position 4 might be removed since the product is no longer the second to most recently on air product. In one exemplary embodiment, where the product representations are rearranged at 224, a product representation highlighted prior to the update may remain highlighted in its new position after the update (if the representation is not removed). Other updates may be with respect to the particular data provided in the home screen about each of the represented products, e.g., its price, its shipping and handling price, whether it is a sale price, whether it is still available, whether it is sold out, etc. For example, the representation in position 2 of FIG. 4 is of the same product in both of parts (a) and (b) of FIG. 4, but with different descriptive data. The representation in part (a) indicates that the product is sold out and the representation in part (b) indicates that the product is available by inclusion of a price.

The types of dynamic updates that are implemented may be restricted to limit a sense of disruption in the shopping session and/or to limit confusion. For example, rearranging the order in which the product representations appear and/or removing a representation may confuse the user, and may therefore be omitted.

It may occur that an update that indicates that a product is no longer available or sold out is received immediately after the user selects the product in the iTV home screen. Similarly, in an embodiment according to which a displayed product representation is not removed even after receipt of an update indicating its unavailability, it may occur that the user selects a product for which an update indicating its unavailability or that it is no longer in stock is received. At 214/216, the set-top box 108 may determine whether a selected product is available and in stock. If it is not available or not in stock, the set-top box 108 may, at 218, display an unavailable/sold out screen informing the user of this status. If the product is still available and not sold out, then navigation may be continued. In one exemplary embodiment, 214/216 may be performed even if the set-top box 108 has not received an update. 214/216 may be performed numerous times throughout a product navigation. For example, when the user selects a color in the color selection page, 214/216 may be performed to determine whether the color is available and in stock.

Once the user has made a complete product selection, the user may indicate a desire to create an order to purchase the selected product and/or options. In response to such an instruction, the set-top box 108 may display a screen for input of log-in data, e.g., as shown in FIG. 11. At 226, the set-top box 108 may receive the log-in data. Performance of 226 at this point in the sequence represented in FIG. 2 is exemplary. In an alternative exemplary embodiment, 226 may be performed when first initiating a shopping session. FIG. 11 shows two log-in screens, the top screen as initially presented to the user and the bottom screen filled out by the user. The screens are shown as overlapping for space purposes only.

Account data, including log-in data, may be locally stored at the set-top box 108 and/or may be stored at the product supplier server 100. For example, the set-top box 108 may provide a display screen requesting the user to input whether the user is a first-time user of the shopping program. If the user inputs data in the affirmative, the set-top box may provide one or more display screens for the user to input personal data, e.g., via the remote control 110A, to set up an account, which may be locally stored or stored at the server 100. In one example embodiment, at least some of the user entered data that provides billing information may be transmitted by the set-top box 108 to the server 100, so that the billing information can be used, e.g., to bill a credit card when an order is placed. In one exemplary embodiment not shown in FIG. 2, where the user enters log-in data for access to an existing account, the set-top box 108 may check whether the log-in data is correct. Alternatively, the product supplier server 100 may perform the check as discussed below.

After receiving the log-in data, the set-top box 108 may, 228, transmit a request to the product supplier server 100 via the content provider 104 to get a customized price for the user. For the request at 228, the set-top box 108 may transmit the selected product(s) information and the log-in data.

Figure 24:
Figure 28:
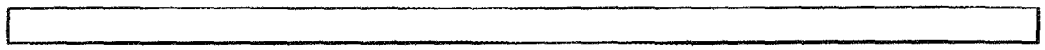
Figure 29:
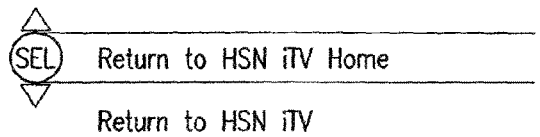

At 230, the product supplier server 100 may receive the request including the selected product information and the log-in data. At 232, the product supplier server 100 may determine whether the log-in data matches an existing account. If a match is found, the product supplier may determine at 234 whether the requested product with the selected options, if any, is available. If it is determined that the requested product is not available the user is so informed, for example, via the screen display shown in FIG. 29. If it is determined that the requested product and/or options are available and in stock, the product supplier server 100, may determine at 236 if shipping of the selected item to the matched customer is available. If it is determined that the item can be shipped, the product supplier server 100 may, at 238, calculate a customized price for the customer. The customization may be based on the number and types of products requested during the present shopping session and based on other orders of the customer, e.g., placed via the iTV or the other systems connected to the product supplier server 100. While the order is being processed the user may see a screen indicating such, for example, as shown in FIGS. 24 and 28.

After calculation of the price or immediately after any one of 232-236 for which a negative determination was made, the product supplier server 100 may, at 240, transmit a price update message, which may either indicate the price that will be charged or may indicate that the order could not be placed.

Figure 12:
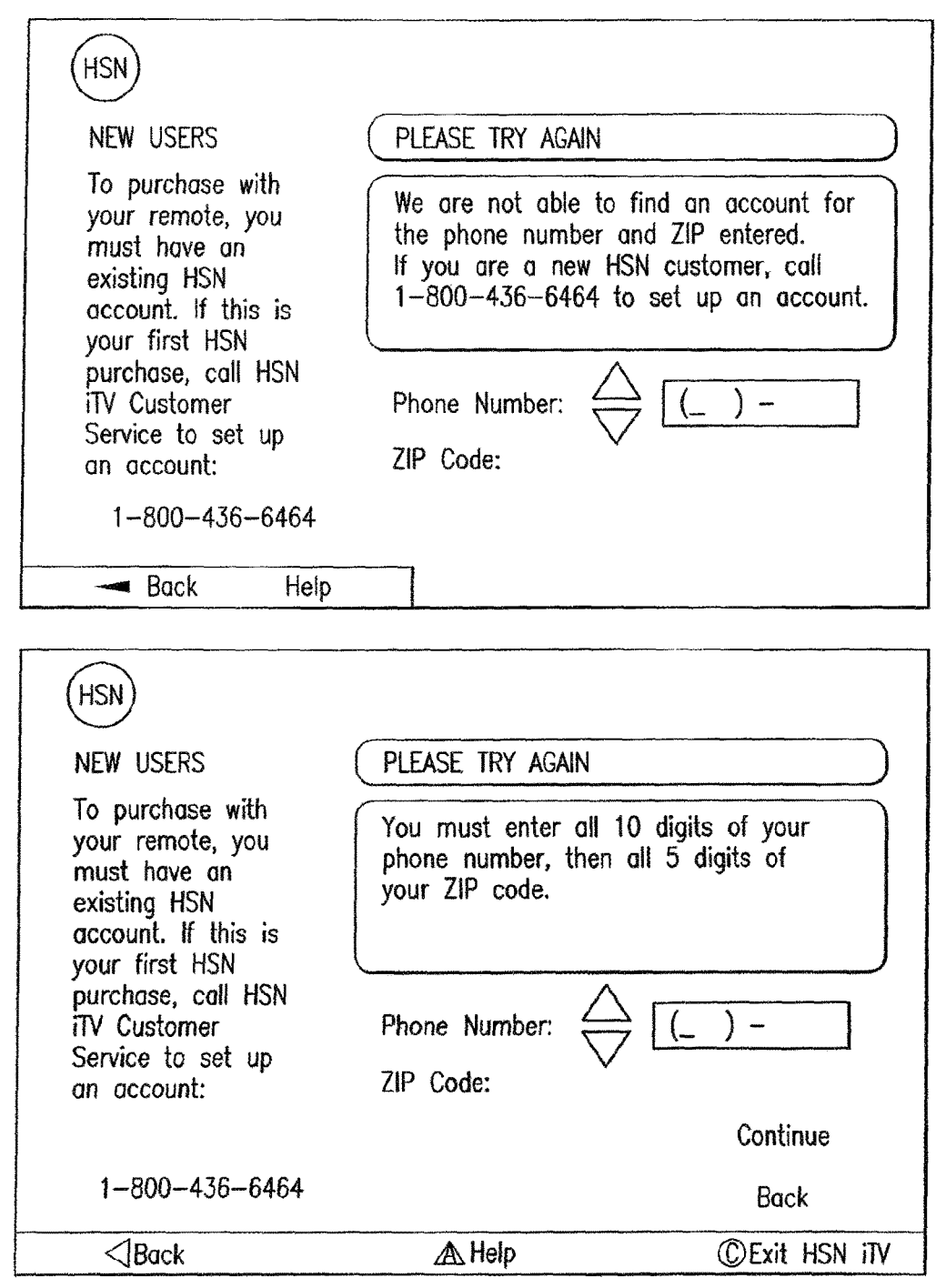

At 242, the set-top box 108 may determine whether the received message includes a price. If it does not include a price, the set top box 108 may, at 244/246, display an error message and/or provide for a re-log-in, e.g., as shown in FIG. 12, depending on the reason for the error indicated in the message received from the product supplier server 100. For example, if the product supplier server 100 determined at 232 that the provided log-in data was incorrect, this may be indicated in the message transmitted at 240. Subsequent to 246, the flow may continue again at 228. FIG. 12 includes two displays with different exemplary error messages. The screens are shown as overlapping for space purposes only.

Figure 17:
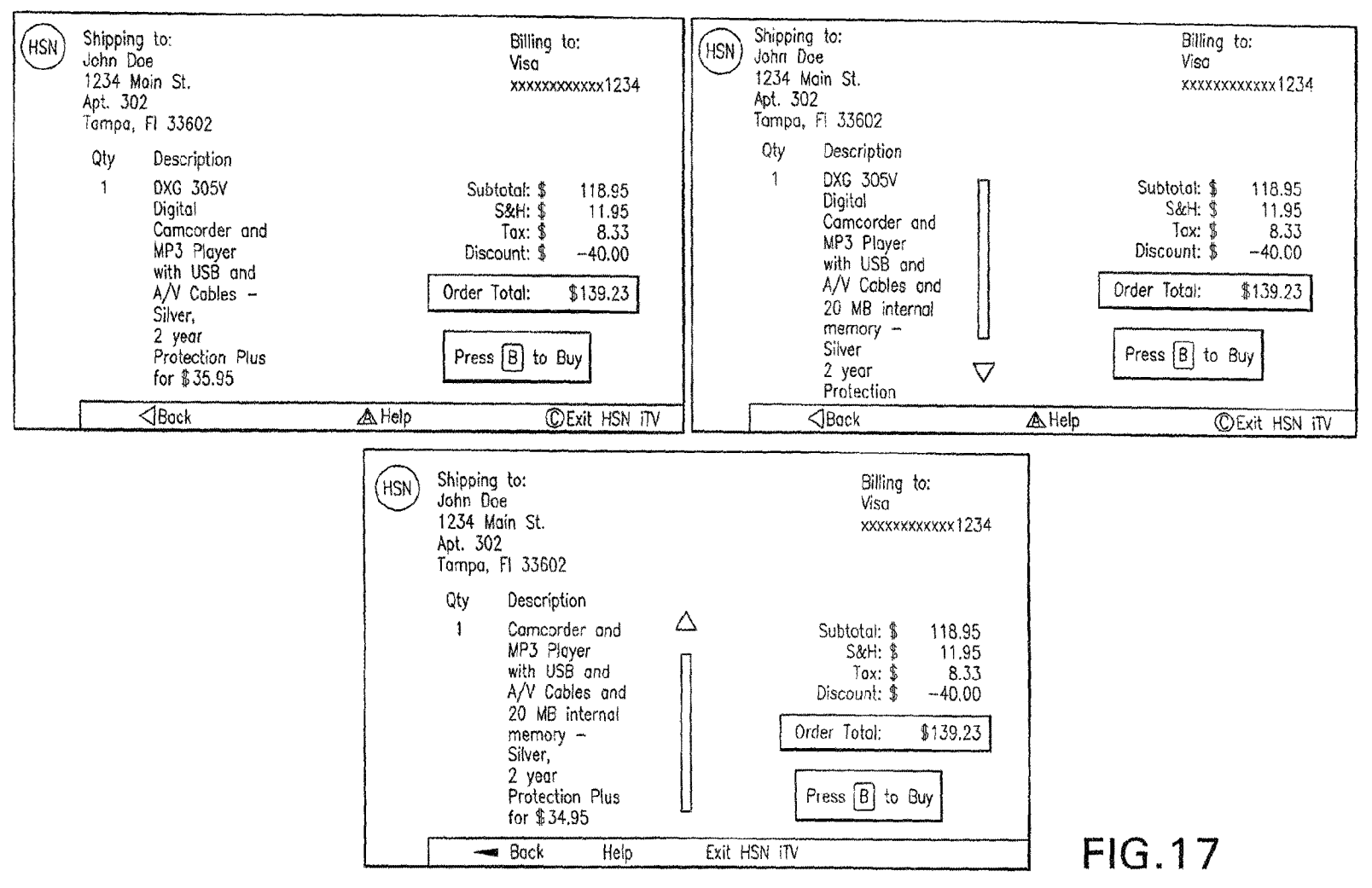

If the received message includes a price, the set-top box 108 may display the updated price to the user and get an order confirmation from the user at 248, e.g., via interaction with a display such as one shown in FIG. 17. After receiving the confirmation, the set-top box 108 may, at 250, transmit the order to the product supplier server 100 via the content provider 104. FIG. 17 shows three different exemplary display screens, each containing different order information.

At 252, the product supplier server 100 may receive the order. At 254, the product supplier server 100 may again check whether the ordered items are available and in stock. If it is determined that the items are available and in stock, the product supplier server 100 may, at 256, charge the user's credit card for which information is stored at the product supplier server 100.

Figure 19:
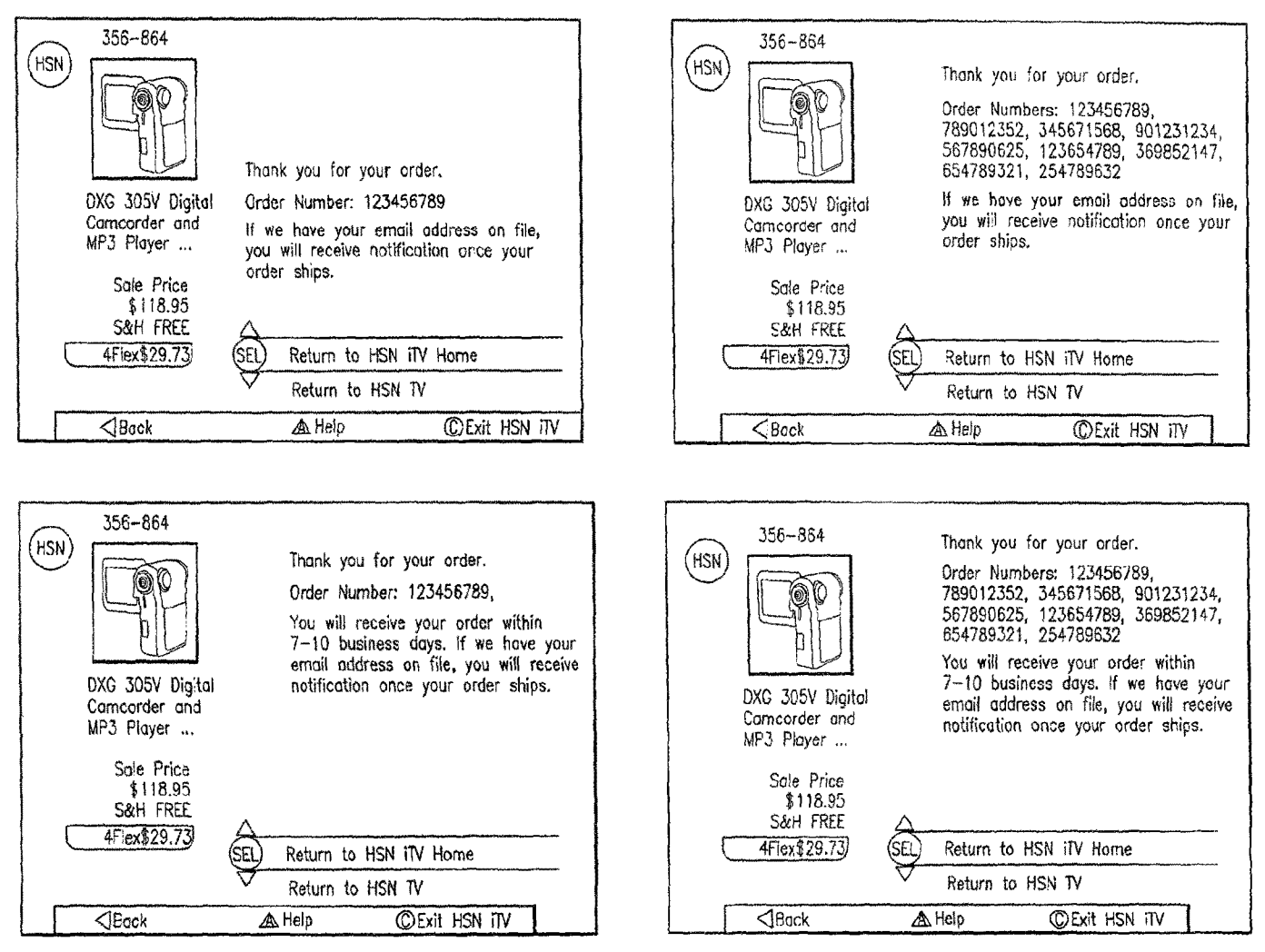

Subsequent to 256, or subsequent to 254 if it is determined at 254 that the items are not available and in stock, the product supplier server 100 may transmit order finalization data. The data may indicate the success or non-success of the order, when to expect the items, confirmation number, etc., e.g., as shown in FIG. 19. FIG. 19 shows four different exemplary confirmation screens, each containing different confirmation information.

In those instances where the content provider 104 server 100 transmits messages after determining that the requested items are unavailable or not in stock, e.g., after 234 or 254, the transmitted messages may identify particular errors. A non-exhaustive list of error messages may include a sold out error message, a waitlist message, a back order message, and a generic message.

Figure 13:

A sold out error message may be provided to indicate a product's status as having been sold out. At 244 or 260, the set-top box 108 may display the error message, e.g., as shown in FIG. 13. The user may navigate from the error message back to the iTV home screen or to the program channel, depending on an implemented embodiment.

A waitlist message may be provided to indicate that the product is currently unavailable but that it is expected to be received and that a user may join a waitlist. At 244 or 260, the set-top box 108 may display the message and indicate that the user may provide input to instruct the set-top box 108 to add the user to the waitlist, e.g., as shown in FIG. 14. For example, the message may indicate that, if the user is added to the waitlist, the item will be shipped to the user immediately on becoming available if it becomes available within a certain period of time and that the user's credit card will be charged at that time. If the user agrees after display of the message at 244, the flow may continue again at 228, this time receiving a price at 242. In an alternative embodiment, the waitlist message may be transmitted with an updated price, in which case the flow may continue at 250. If the user does not agree to proceed with the order, the user may navigate from the error message back to the iTV home screen or to the program channel, depending on an implemented embodiment.

Figure 15:
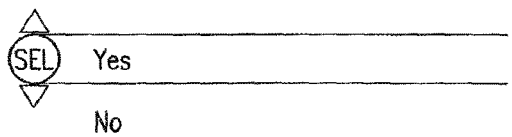
Figure 20:

A back order message may be provided to indicate that the product is currently unavailable but that it is expected to be ready for shipment at a particular date. At 244 or 260, the set-top box 108 may display the message and indicate that the user may provide input to instruct the set-top box 108 to put the order through and have the items shipped and the credit card charged on the particular date, e.g., as shown in FIG. 15. The flow may then continue as discussed with respect to the waitlist message.

A generic message may be provided, e.g., as shown in FIG. 16, when some other non-specific error occurs, such as when a database cannot be accessed at the time. The user may navigate from the error message back to the iTV home screen or to the program channel, depending on an implemented embodiment.

The product supplier server 100 may receive requests for data, e.g., for a session initiation, price updates, order placements, and/or other product and/or customer updates from numerous set-top boxes 108, numerous terminals 103 of the computer terminal network 102, and numerous IVR system 101 calls. Responses to different ones of the calls may require different processing times. Accordingly, in an example embodiment of the present invention, the product supplier server 100 may maintain two asynchronously operated queues, an incoming queue and an outgoing queue. As requests are received, the requests may be added to the incoming queue. As the product supplier server 100 addresses the incoming requests, outgoing messages responsive to the requests may be generated and completed in a different order than in which the incoming requests to which the outgoing messages correspond were received. The outgoing messages may therefore be added to the outgoing queue in that different order, i.e., the order in which outgoing messages were completed. Each outgoing message may include a destination address to which the outgoing message is to be transmitted.

Figure 30:
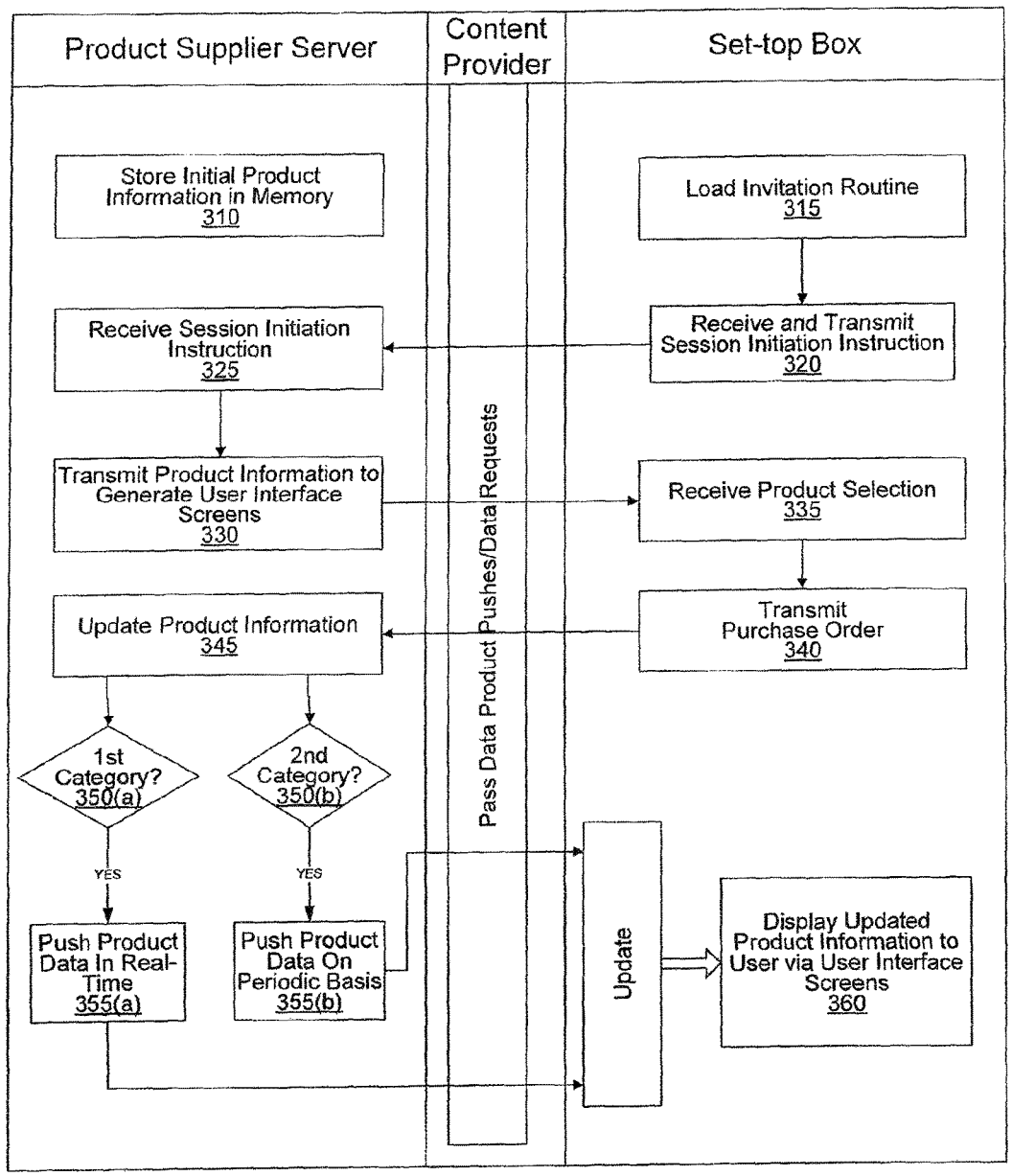
FIG. 30 illustrates a flowchart for a method for electronic shopping in accordance with another embodiment of the present invention.

FIG. 30 illustrates a flowchart for a method for electronic shopping in accordance with another embodiment of the present invention. As shown, the exemplary method for electronic shopping illustrates how product information can be updated and presented to a customer either on a scheduled periodic basis or a real-time basis, depending on the category of the particular product.

In particular, the method illustrated in FIG. 30 can be achieved employing the components illustrated in FIG. 1. Specifically, in the embodiment, product supplier server 100 and content provider 104 are configured to update production information presented to a user either in real-time or on a scheduled periodic basis. It is noted that while the exemplary embodiment employs product supplier server 100 and content provider 104 as separate servers, in a refinement of the exemplary embodiment, a single server may be provided having the functionality of both product supplier server 100 and content provider 104.

With further reference to FIG. 1, memory 116A of product supplier server 100 is configured to store product information about the various products offered to a customer for sale. This product information can include product image files, video files, sizing information, a list of selectable colors, inventory data, sales price, customer rebate information, and the like. Furthermore, in the exemplary embodiment, product supplier server 100 is configured to update the product information in response to receipt of certain transactional and data requests. As discussed above, product supplier server 100 may receive requests for data and purchase order request from numerous set-top boxes 108 of TV network 106, numerous terminals 103 of computer terminal network 102, and the like. Upon receipt of any of these requests, product supplier server 100 is configured to process each of them and update the relevant product information stored in memory 116A accordingly.

In addition, product supplier server 100 is further configured to send updated information regarding the particular products as updated product data pushes. As will be discussed in detail with respect to FIG. 30, such updated information is transmitted on either a scheduled periodic basis or on a real-time basis. Moreover, whether the updated information is transmitted on the scheduled periodic basis or the real-time basis will be determined by the designated category of the particular product. For example, updated product information relating to products that fall within a "today's special" and/or a "currently on air" category may be transmitted on a real-time basis, while updated product information relating to all other products may be transmitted on a scheduled periodic basis. By enabling the system engineer to explicitly limit the product information that is updated on a real-time basis to one or more particular product categories, communication exchange system 100 prevents any unnecessary memory burden for processor 115E and memory 116E of set-top boxes 108. Further, this feature may be used to facilitate transactions involving more popular products, e.g., products the subject of a of live broadcast feed, by assuring that the most current order information is communicated for these products.

As further shown in FIG. 1, content provider 104 is configured to communicate with product supplier server 100 for retrieval of data to provide product information to a customer who logs into communication exchange system 100 for an electronic shopping session. Moreover, content provider 104 is configured to receive automatic updates from product supplier server 100, such as product data pushes, based on updates to data stored in memory 116A of product supplier server 100.

Content provider 104 is further configured to generate user interface screens based on the product information, such as those illustrated in FIGS. 3 to 29, and to transmit at least one of the user interface screens to one or more set-top boxes 108, e.g., in response to a request from the respective set-top box. A portion of the user interface screens may be adapted for user interaction at the set-top box 108 to communicate with content provider 104 to conduct a transaction. Moreover, program content, such as video and image files, e.g., transmitted from product supplier server 100, may be processed and formatted by content provider 104, e.g., converted to MP2 format, before sending to set-top boxes 108.

Content provider 104 may also receive from set-top boxes 108 transaction interaction information and, in turn, transmit this information to product supplier server 100. Set-top box 108 may render content received from content provider 104 for display (i.e., the user interface screens) on a user's TV 144, receive commands from the user via the user's input device 110A, transmit information to content provider 104 in response to some of the user commands, and change the television display in response to the same or other of the user commands. As indicated above, examples of screenshots for such user interface screens include, for example, those illustrated in FIGS. 3-29 and discussed above.

In the exemplary embodiment of the present invention, product information, which relates to products in predefined categories, stored in product supplier server 100, may be displayed on a customer's TV 144 reflecting real-time product details. Specifically, the product details may be determined by a combination of transactions conducted via each of computer terminal network 102 and television network 106 (and any other conduit in communication with content provider 104 and/or product supplier server 100 and via which transactions may be processed) and for which information is updated at product supplier server 100 as soon as a transaction is processed. If the products fall within a particular category, the product information will be displayed to a customer in real-time. Otherwise, updates are communicated to the customer in an alternative manner, e.g., on a scheduled periodic basis.

According to the exemplary embodiment, products of an iTV shopping channel, i.e., a channel that can be used as a portal to begin a shopping session, may be categorized into two or more of general categories. A number of different possible product categories are discussed in U.S. patent application Ser. No. 12/330,385, filed on Dec. 8, 2008 by Johnson et al. and entitled "METHOD AND SYSTEM FOR IMPROVED E-COMMERCE SHOPPING," which is hereby incorporated in its entirety by reference thereto.

Product categories may be presented to the user based on the type of product sold such as a cooking products category, a houseware products category, a beauty products category, etc. Further, additional categories that distinguish between products based on when and how they are presented for sale may include a "currently on air" category, a "this day only" category, a "most recently aired" product category, and the like. These categories may be classified as separate categories or, alternatively, as sub-categories of the aforementioned categories. For example, a "this day only" product may be classified as a sub-category of the "today's special" category. It is noted that the "this day only" product may be one that is presently identified by the product supplier to be available for only the present day. Each of the "today's special" products may be products offered at a special price for a given time period (i.e., that day). Furthermore, the "most recently aired" product may be a product aired prior to the "currently on air" product(s). The "most recently aired" product category may include a plurality of sub-categories. A first sub-category may be the "immediately preceding on air" product category. A second sub-category may be the "second to most recently on air" product category, etc.

In an exemplary embodiment, a first category of products may be classified as a "currently on air" category, and a second category of products may include all other products for sale. Each of the "currently on air" products may be one that is featured on the channel's program at the time. It is contemplated that a particular product falling in the first category may be the subject of a live broadcast feed. In this aspect, a customer may be able to view the live feed in which features of the given product are discussed.

As shown in FIG. 30, at step 310, product information is initially stored in memory 116A of product supplier server 100. This product information may be loaded manually by the system engineer or automatically based on ongoing transactions being communicated with the server. In particular, memory 116A is loaded with product information regarding products in each of the foregoing categories, such as the "currently on air" category or the "today's special" category. As such, the product data will include an indication of which category the product is classified within. While in no way intended to be an exhaustive list, the product information can further include: a plurality of electronic image and/or video files illustrating and marketing each product; a list of selectable colors, sizes and other product features for each product; a price listing; an indication of available inventory of each product; and the like. Furthermore, it is noted that the performance of step 310 is not necessarily performed at a discrete time. For example, product information relating to products in the "currently on air" category may be continuously stored in memory 116A as long as these products are actually "on air". Alternatively, products classified in the "this day only" category may be manually entered by the system engineer at the start of the day, for example.

Once product information is loaded in memory 116A, an electronic shopping session can be initiated by a customer. To begin the electronic shopping session, the customer may instruct a set-top box 108, via input device 110A, to tune to a channel containing the iTV application, e.g., the iTV channel, a linear channel, a VOD channel, a separate digital channel, etc. In response, an invitation-to-shop routine may be automatically loaded upon tuning to the channel (step 315). In the exemplary embodiment, set-top box 108 may be preprogrammed to auto-load the routine. Alternatively, content provider 104 may transmit instructions to set-top box 108, which, when executed by set-top box 108, cause set-top box 108 to load the invitation-to-shop routine.

Once the invitation-to-shop routine is loaded, set-top box 108 may receive a session initiation instruction from the user via input device 110A. In response to this instruction, set-top box 108 may perform a routine(s) for loading a session. The routines for loading the session may include transmitting a session initiation instruction to content provider 104 (step 320), which, in turn, may relay the session initiation instruction to product supplier server 100 (step 325). Upon receipt, product supplier server 100 may transmit product data in an XML document, for example, to content provider 104. In the exemplary embodiment, the product data may include product information pertaining to products in the aforementioned categories. Alternatively, the products may be broken into categories by the content provider. It is noted that as shown in FIG. 30, content provider 104 processes each data request and/or product data push, as discussed above, to either the product supplier server 100 and/or set-top box 108, respectively.

In another embodiment, rather than prompting product supplier server 100 to transmit product data in an XML document, information used to provide a shopping session may be periodically transmitted by product supplier server 100 to content provider 104 without addressing any particular set-top box 108. As a result, content provider 104 may handle the session initiation on its own by passing on the relevant product information to the particular set-top box 108. In yet another embodiment, content provider 104 may pass the periodically received transmissions to the set-top box 108 without receipt of a session initiation instruction from the particular set-top box 108. However, such unprovoked transmissions to set-top boxes 108 may be omitted so as not to cause a memory burden on memory 116E of set-top boxes 108.

In either embodiment, once content provider 104 receives the product data transmitted by product supplier server 100, content provider 104 generates a plurality of user interface screens to be transmitted to set-top box 108 (step 330). For example, an iTV home screen page based on the received data may be generated by content provider 104 and displayed by set-top box 108 to illustrate information concerning the products described in the received data.

Moreover, in one embodiment, the presentation of information may be in accordance with a rule set executed by content provider 104. For example, the rule set may provide that information about only three products is to be simultaneously displayed. For display of information about a fourth product, a scrolling feature may be provided. As shown in part (a) of FIG. 4 and discussed above, a screen shot of a user interface screen presenting a first three products and an arrow at the top right of the right-most of the presentation of the three products, indicating that the user may scroll right for display of a presentation of a fourth product. In response to input of a scrolling command, i.e., a right arrow of input device 110A, set-top box 108 may shift the display so that the screen appears as is shown in part (b) of FIG. 4. The screen shot shown in part (b) of FIG. 4 illustrates a user interface screen presenting the last three products, whereas the presentation of the first product (the left-most product) has been removed. The user interface screen also presents the arrow at the top left of the left-most of the presentation of the three products, indicating that the user may scroll left for display of the presentation of the first product.

In response to operation of a scrolling instruction, set-top box 108 may shift the activation of a page link of a first product presentation to a following displayed product presentation until a page link of a last displayed product presentation is displayed. In response to a subsequent scrolling instruction in the same direction, set-top box 108 may shift the displayed representations as described and activate the page link of the newly added product presentation. Set-top box 108 may indicate which presentation's link is activated by highlighting the presentation. For example, if set-top box 108 receives a scrolling instruction to the right when the right-most representation of the screen shot shown in part (a) of FIG. 4 is highlighted, set-top box 108 may display the screen shot of the user interface screen shown in part (b) of FIG. 4, with the left-most product representation highlighted.

Furthermore, in the exemplary embodiment, the rule set may provide that of the four product representations, the presentation at position 1 should correspond to the "currently on air" product (if available), the presentation at position 2 should correspond to the "last most recently on air" product, the presentation at position 3 should correspond to the "today's special" product (if available), and the presentation at position 4 should correspond to the "second most recently on air" product. If the "today's special" and "currently on air" products are one in the same, the rule set may provide for display of the product representation at position 1. If the product is no longer the "on air" product, but is the "most recently on air" product, the rule set may provide for display of the product representation at position 2. If it is the "second to most recently air" product, "third to most recently air" product, etc., then the rule set may provide for display of the product representation at position 3. It is reiterated, however, that the described rules of the rule set are exemplary.

Once the iTV home screen page illustrating the available products is presented to the user by set-top box 108, set-top box 108 may receive a product selection at step 335. A product selection may be a signal received when the user presses a select button of input device 110A while a particular product presentation is highlighted, i.e., the page link of the product representation is activated. In response, set-top box 108 may provide for navigation of multiple user interface screen relating to the selected product. The navigation may include initially proceeding to a user interface screen associated with the activated link of the iTV home screen. The navigation may be performed based on the data transmitted at 330 and based on which the iTV home screen was displayed. Navigation may be between a non-exhaustive list of user interface screens as shown in FIGS. 6-10, for example. Of course it should be clear that the particular user interface screens between which the user may navigate may depend on the product being navigated.

After navigating through the various user interface screen and selecting a product for purchase, set-top box 108 is configured to transmit a purchase order signal to content provider 104 (step 340), which, in turn, may relay the purchase order signal to product supplier server 100. Upon receipt, at step 345, product supplier server 100 may process the purchase order and accordingly update sales and inventory records in memory 116A. It is noted that for purposes of this embodiment, the foregoing purchase process is disclosed for exemplary purposes. A more detailed explanation of an example purchasing process is discussed above. It should be clear, however, that during electronic shopping, product supplier server 100 may receive requests for data and purchase order requests, e.g., for a session initiation, price updates, order placements, and/or other product and/or customer updates from numerous set-top boxes 108 of TV network 106, numerous terminals 103 of computer terminal network 102, and the like. Upon receipt of any of these requests, product supplier server 100 is configured to process each of them and update the product information stored in memory 116A accordingly.

Product supplier server 100 performs product data pushes to reflect updates to the product data in memory 116A. The timing and frequency of these data pushes may be controlled, for example, to enhance the shopping experience for the user and to reduce the memory burden on the set-top box. Specifically, at steps 350(*a*) and 350(*b*), product supplier server 100 identifies the category of the particular product, whose data has been updated, to determine how the product data push should be executed.

In an exemplary embodiment, if the product is in the "currently on air" category (i.e., a first category), the product data push will be performed in real-time basis each time there is an update to the product data. The product classified in the "currently on air" category may be subject to a live broadcast feed. For products in a second category, e.g., all other products offered for sale, the product data push will be performed on a scheduled periodic basis, e.g., at set intervals.

In an alternative embodiment, updates to products in additional categories may be pushed differently. For example, updates to product information in a third category of products may be updated real time during a first portion of the day and on a periodic basis during a second portion of the day.

In an exemplary embodiment, the timing and frequency of the product update pushes may be dictated by a different rule set independent of product category. For example, a different timing and frequency for the push may be used for different days or for different times of the day.

Once product supplier server 100 identifies the scheduling for product data pushes, product supplier server 100 transmits the updated data, e.g., in an XML document, to be viewed by the user (steps 355(*a*) and 355(*b*), respectively). In either case, the updated data product pushes are transmitted to content provider 104 and in turn transmitted to set-top box 108 for display to the user. For example, if the available inventory for a "currently on air" product has decreased as a result of a purchase, the updated number of available products is transmitted in real-time to set-top box 108, such that the user readily sees this information, via the user interface screens. In another example, if the sales price of the "currently on air" product is changed by the system engineer, the sales price information displayed to the user, in FIG. 8 for example, will be updated in real-time.

If the product data push is to be performed on a scheduled periodic basis, product supplier server 100 transmits the updated product data to content provider 104, which may then transmit this information to set-top box 108 as defined by the periodic schedule. Moreover, in the exemplary embodiment, the updated product information is transmitted by content provider 104 the next time it is prompted by set-top box 108 to transmit a user interface screen as described above.

In another aspect of this embodiment, the user interface screens may include video, for example, providing detail regarding a product for sale via interaction with the user interface screen. It may be useful, for example, to include video for periodically updated user interface screens offering for sale products that are not the subject of a live broadcast feed.

In any event, upon receipt of the product data push as discussed above, set-top box 108 may update the presently rendered display (step 360), e.g., the iTV home screen or another page to which the user has navigated, or information upon which the display to be rendered in the session is based, such that the allowed navigation or the information to be provided in the navigable pages is changed. For example, if both the home screen is displayed when the new data is received and the new data provides for a different home screen than the displayed home screen, set-top box 108 can dynamically update the display to reflect the change.

Referring back to FIG. 4, for example, the product presented at position 1 might be indicated in the new data to be a "most recently on air" product, rather than the "currently on air" product. Accordingly, set-top box 108 may move the presentation to position 2 and may provide a presentation of another product indicated to be the "currently on air" product in position 1. Similarly, the presentation of the product in position 4 might be removed since the product is no longer the "second to most recently on air" product. As discussed above, other updates may be with respect to the particular data provided in the home screen about each of the represented products, such as its price, its shipping and handling price, whether it is a sale price, how many products are still available in inventory, whether it is sold out, etc. For example, the representation in position 2 of FIG. 4 is of the same product in both of parts (a) and (b) of FIG. 4, but with different descriptive data. The representation in part (a) indicates that the product is sold out and the representation in part (b) indicates that the product is available by inclusion of a price.

While the foregoing has been described in conjunction with an exemplary embodiment, it is understood that the term "exemplary" is merely meant as an example. Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications and variations will become apparent to the skilled practitioner upon a study of the drawings and specification. Such modifications and variations are considered to be within the purview and scope of the appended claims and their equivalents.

Additionally, in the preceding detailed description, numerous specific details have been set forth in order to provide a thorough understanding of the present invention. However, it should be apparent to one of ordinary skill in the art that the inventive test circuit may be practiced without these specific details. In other instances, well-known methods, procedures, components, and circuits have not been described in detail so as not to unnecessarily obscure aspects of the invention.

The invention claimed is:

1. A set-top box comprising:
a processor configured to facilitate television based transactions,
wherein the set-top box is configured to:
 transmit a user request to at least one server,
 receive, from the at least one server, first and second digital information, wherein the first digital information relates to a first product and second digital information relates to a second product, display, on a television coupled to the set-top box, the first and second digital information by a plurality of user interface pages navigable by a user, transmitting, to the at least one server, page navigation information relating to a current page of the plurality of user interface pages that is being displayed on the television, wherein the page navigation information indicates whether at least one of the first digital information relating to the first product and the second digital information relating to the second product is being displayed on the current page, when the current page is displaying the first digital information, receive, from the at least one server, unscheduled updates of the first digital information whenever there is an update to the first digital information, dynamically display the updated first digital information relating to the first product on the current page, when the current page is not displaying the second digital information, receive scheduled updates of the second digital information relating to the second product, and configure at least a portion of at least one of the plurality of user interface pages for the user of the set-top box to conduct an electronic transaction of at least one of the first and second products.

2. The set-top box of claim 1, wherein the set-top box is further configured to concurrently display the first and second digital information relating to the first and second products, respectively, on the current page on the television.

3. The set-top box of claim 1, wherein at least one of the first and second products that is currently being displayed on the current page is the subject of a streaming broadcast.

4. The set-top box of claim 3, wherein another of the first and second products that is currently being displayed on the current page is not the subject of the streaming broadcast.

5. The set-top box of claim 1, wherein the plurality of user interface pages are received by the set-top box as at least one eXtensible Markup Language (XML) document.

6. A method for displaying and updating electronic information on a display device, the method comprising:

storing in at least one electronic database first digital information relating to a first product and second digital information relating to a second product;

transmitting the first and second digital information to the display device to be displayed thereon by a plurality of user interface pages navigable by a user;

determining a current page of the plurality of user interface pages that is being displayed on the display device;

determining whether at least one of the first digital information relating to the first product and the second digital information relating to the second product is being displayed on the current page;

when the current page is displaying the first digital information, transmitting, to the display device, unscheduled updates of the first digital information whenever there is an update to the first digital information stored in the at least one electronic database, such that the current page dynamically displays updated first digital information relating to the first product; and when the current page is not displaying the second digital information, transmitting, to the display device, scheduled updates of the second digital information relating to the second product.

7. The method of claim 6, wherein the first and second digital information relating to the first and second products, respectively, are concurrently displayed on the current page on the display device.

8. The method of claim 6, further comprising transmitting the first and second digital information and the unscheduled and scheduled updates to the display device through a first server and a second server in communication with the first server.

9. The method of claim 6, wherein at least one of the first and second products that is currently being displayed on the current page is the subject of a streaming broadcast.

10. The method of claim 9, wherein another of the first and second products that is currently being displayed on the current page is not the subject of the streaming broadcast.

11. The method of claim 6, further comprising configuring at least a portion of at least one of the plurality of user interface pages for the user to conduct an electronic transaction.

12. A method for displaying and updating electronic information on a display device, the method comprising:

receiving, from at least one server, first and second digital information to be displayed on the display device by a plurality of user interface pages navigable by a user, wherein the first and second digital information is stored in at least one electronic database and the first digital information relates to a first product and second digital information relates to a second product;

transmitting, to the at least one server, information relating to a current page of the plurality of user interface pages that is being displayed on the display device, wherein the transmitted information indicates whether at least one of the first digital information relating to the first product and the second digital information relating to the second product is being displayed on the current page;

when the current page is displaying the first digital information, receiving unscheduled updates of the first digital information whenever there is an update to the first digital information stored in the at least one electronic database, and dynamically displaying on the current page updated first digital information relating to the first product; and when the current page is not displaying the second digital information, receiving scheduled updates of the second digital information relating to the second product.

13. The method of claim 12, further comprising concurrently displaying the first and second digital information relating to the first and second products, respectively, on the current page on the display device.

14. The method of claim 12, wherein at least one of the first and second products that is currently being displayed on the current page is the subject of a streaming broadcast.

15. The method of claim 14, wherein another of the first and second products that is currently being displayed on the current page is not the subject of the streaming broadcast.

16. The method of claim 12, further comprising configuring at least a portion of at least one of the plurality of user interface pages for the user of the display device to conduct an electronic transaction.

17. A method for displaying and updating electronic information on a display device, the method comprising:

transmitting a user request from a set-top box coupled to the display device to at least one server;

receiving, at the set-top box from the at least one server, first and second digital information, wherein the first digital information relates to a first product and second digital information relates to a second product;

causing, by the set-top box, the first and second digital information to be displayed on the display device by a plurality of user interface pages navigable by a user, transmitting, to the at least one server, page navigation information relating to a current page of the plurality of user interface pages that is being displayed on the display device, wherein the page navigation information indicates whether at least one of the first digital information relating to the first product and the second digital information relating to the second product is being displayed on the current page;

when the current page is displaying the first digital information, receiving unscheduled updates of the first digital information whenever there is an update to the first digital information, such that the current page dynamically displays updated first digital information relating to the first product; and when the current page is not displaying the second digital information, receiving scheduled updates of the second digital information relating to the second product.

18. The method of claim 17, further comprising concurrently displaying the first and second digital information relating to the first and second products, respectively, on the current page on the display device.

19. The method of claim 17, wherein at least one of the first and second products that is currently being displayed on the current page is the subject of a streaming broadcast.

20. The method of claim 19, wherein another of the first and second products that is currently being displayed on the current page is not the subject of the streaming broadcast.

21. The method of claim 17, further comprising configuring at least a portion of at least one of the plurality of user interface pages for the user of the display device to conduct an electronic transaction.

22. A system for displaying and updating electronic information on a display device, the system comprising:

at least one electronic database that stores first digital information relating to a first product and second digital information relating to a second product;

at least one server that transmits the first and second digital information to the display device to be displayed thereon by a plurality of user interface pages navigable by a user; and at least one processor configured to determine a current page of the plurality of user interface pages that is being displayed on the display device and to further determine whether at least one of the first digital information relating to the first product and the second digital information relating to the second product is being displayed on the current page, wherein, when the current page is displaying the first digital information, the at least one server is configured to transmit, to the display device, unscheduled updates of the first digital information whenever there is an update to the first digital information stored in the at least one electronic database, such that the current page dynamically displays updated first digital information relating to the first product on the display device, and when the current page is not displaying the second digital information, the at least one server is configured to transmit, to the display device, scheduled updates of the second digital information relating to the second product.

23. The system of claim 22, wherein the first and second digital information relating to the first and second products, respectively, are concurrently displayed on the current page on the display device.

24. The system of claim 22, wherein at least one of the first and second products that is currently being displayed on the current page is the subject of a streaming broadcast.

25. The system of claim 24, wherein another of the first and second products that is currently being displayed on the current page is not the subject of the streaming broadcast.

26. The system of claim 22, wherein the at least one processor is further configured to configure at least a portion of at least one of the plurality of user interface pages for the user to conduct an electronic transaction.

27. The system of claim 22, wherein the at least one server is further configured to transmit the plurality of user interface pages as at least one eXtensible Markup Language (XML) document.

* * * * *